United States Patent [19]
Diamantoglou et al.

[11] Patent Number: 6,019,925
[45] Date of Patent: Feb. 1, 2000

[54] METHOD OF MAKING CELLULOSIC DIALYSIS MEMBRANE

[75] Inventors: Michael Diamantoglou, Erlenbach; Martin Nywlt, Obernburg; Winfried Hölz, Hausen, all of Germany

[73] Assignee: Akzo Nobel NV, Arnhem, Netherlands

[21] Appl. No.: 08/856,861

[22] Filed: May 15, 1997

[30] Foreign Application Priority Data

May 15, 1996 [DE] Germany ............................ 196 19 611

[51] Int. Cl.⁷ ..................................................... C08J 9/28
[52] U.S. Cl. ........................... 264/203; 264/187; 264/207
[58] Field of Search ............................. 264/41, 187, 203, 264/207, 211.12; 210/500.29, 500.23

[56] References Cited

U.S. PATENT DOCUMENTS

| | | | |
|---|---|---|---|
| 4,426,228 | 1/1984 | Brandner et al. | 264/187 |
| 4,806,291 | 2/1989 | Susa | 264/41 |
| 4,851,522 | 7/1989 | Chanzy et al. | 536/56 |
| 4,872,983 | 10/1989 | Dimantoglou et al. | 210/500.29 |
| 5,008,385 | 4/1991 | Diamantoglou | 264/187 |
| 5,171,444 | 12/1992 | Diamantoglou et al. | 210/500.23 |
| 5,360,636 | 11/1994 | Diamantoglou et al. | 427/244 |
| 5,540,874 | 7/1996 | Yamada et al. | 264/187 |
| 5,601,771 | 2/1997 | Ruf | 264/187 |
| 5,656,224 | 8/1997 | Zikeli et al. | 264/207 |
| 5,658,524 | 8/1997 | Portnoy et al. | 264/203 |

FOREIGN PATENT DOCUMENTS

| | | |
|---|---|---|
| 1171615 | 7/1984 | Canada . |
| 3021943 C2 | 1/1982 | Germany . |

OTHER PUBLICATIONS

D.E. Chenoweth et al., *Kidney International*, vol. 24, 1983, pp. 764–769, "Anaphylatoxin Formation During Hemodialysis; Effects of Different Dialyzer Membranes".

D.E. Chenoweth, *Asaio–Journal*, vol. 7, 1984, pp. 44–49, "Biocompatibility of Hemodialysis Membranes".

*Primary Examiner*—John Kim
*Attorney, Agent, or Firm*—Oliff & Berridge, PLC

[57] ABSTRACT

A method for producing cellulosic dialysis membranes in the form of flat, tubular, or hollow fiber membranes by spinning a spinning solution of cellulose and/or modified cellulose, a tertiary amine oxide, and additional liquids and additives such as stabilizers, pore formers and the like is provided. The method operates at high takeoff speed and produces membranes for the low, middle, and high flux ranges. The membranes show practically no aging and have a stable structure. The oxidative breakdown of cellulose in the manufacture of the membranes is extremely low and hemocompatability is very good.

30 Claims, 32 Drawing Sheets

1 : 7500

1 : 32 500

Inside wall

1 : 32 500

1 : 50 000    Inside wall

1 : 32 500

1 : 32 500

Inside wall
1 : 55 000

1 : 87 500

1 : 87 500     Inside wall

1 : 87 500

1 : 87 500

1 : 87 500

1 : 87 500　　Inside wall

Outside wall

1 : 87 500

1 : 87 500

1 : 87 500

Membrane Interior     1 : 87 500

METHOD OF MAKING CELLULOSIC DIALYSIS MEMBRANE

BACKGROUND OF THE INVENTION

1. Field of Invention

The invention relates to cellulosic dialysis membranes, methods for their manufacture, and their use especially for hemodialysis, hemofiltration, and hemodiafiltration, with the term "cellulosic" meaning: consisting of cellulose or modified cellulose, mixtures of cellulose and modified cellulose, possibly mixed with synthetic polymers.

2. Discussion of Related Art

Dialysis membranes made of synthetic or natural polymers can very easily cause blood to clot when used in artificial kidneys, but this can be largely prevented by suitable drug treatment.

When a kidney patient receives dialysis treatment using dialyzers that contain membranes made of regenerated cellulose, a temporary drop in the white blood cell count takes place during the initial phase of dialysis treatment. This effect is termed leukopenia.

Leukopenia is a drop in the number of leukocytes (white blood cells) in the bloodstream. The number of white blood cells in humans is approximately 4000 to 12,000 cell/m$^3$. Leukopenia is most pronounced 15 to 20 minutes after dialysis treatment begins, and the neutrophils can disappear almost completely. The number of leukocytes then recovers within about 1 hour and returns to almost the initial value, or exceeds it. When a fresh dialyzer is connected after the leukocytes recover, leukopenia recurs to the same degree.

Cellulose membranes cause pronounced leukopenia. Although the clinical significance of leukopenia has not yet been scientifically clarified, there is a desire to have a dialysis membrane for hemodialysis that does not display the effect of leukopenia without the other highly desirable positive properties of dialysis membranes made of regenerated cellulose being adversely affected as a result.

When hemodialysis is performed using membranes made of regenerated cellulose, manufactured by the cuprammonium method, definite complement activation has also been found in addition to the leukopenia. The complement system within the blood serum is a complex plasma enzyme system consisting of many components that serves to defend against injury caused by invading foreign cells (bacteria and the like) in different ways. If antibodies against structures on the foreign surface are present, the complement system can be activated in the classical fashion; otherwise complement activation takes place in an alternative pathway through special features of the foreign surface. The complement system consists of a plurality of plasma proteins. Following activation, these proteins react with one another specifically in a certain sequence and eventually a cell-damaging complex is formed that destroys the foreign cell.

Peptides are released from individual components that trigger the inflammation phenomena and can sometimes also have undesired pathological consequences for the organism. It is assumed that the activation in hemodialysis membranes made of regenerated cellulose takes place via the alternative pathway. These complement activations are determined objectively by determining the complement fragments $C_{3a}$ and $C_{5a}$.

In this connection, reference will now be made to the following articles: D. E. Chenoweth et al., Kidney International, Vol. 24, p. 764 et seq., 1983 and D. E. Chenoweth, Asaio-Journal, Vol. 7, p. 44 et seq., 1984.

Complement activation is judged by the measurement of the $C_{5a}$ fragments within the scope of the present invention. For this purpose, 300 ml of heparinized blood is recirculated in vitro for a period of 3 hours at a flowrate of 250 ml per minute through a dialyzer with 1–1.3 m$^2$ effective exchange area. The $C_{5a}$ fragments are determined in the blood plasma with the aid of the ELISA method developed by Behring, Marburg (enzyme linked immunosorbent assay). The relative complement activation for the respective measuring time is calculated from the ratio of the concentration at the time the sample is collected to the concentration at the beginning in percent. The measured value after 3 hours recirculation time is used for evaluation. Flat membranes are incubated with heparinized blood plasma for 3 hours and the $C_{5a}$ fragments are then determined.

Thrombogenesis is evaluated on the basis of TAT (thrombin-antithrombin) and PC (platelet count).

An increase in the beta-2-microglobulin level is observed in long-term dialysis patients following the use of membranes made from regenerated cellulose and is attributed to the fact that these membranes are less permeable in the molecular weight range from 1000 to 20,000 and the microglobulins therefore are not removed to a sufficient extent during dialysis. The beta-2-microglobulin is not adsorbed to a significant degree on conventional membranes made of regenerated cellulose. For this purpose however the cellulose derivatives used according to the invention can make an unanticipated contribution.

The average degree of polymerization (DP) of the cellulose is determined in a copper ethylenediamine solution according to DIN 54270.

The degree of modification or substitution (DS) is determined on the basis of analyses that are known for the substituents and are typical, for example nitrogen according to Kjeldahl, sulfur according to Schöniger, and alkyl or aryl residues using NMR, UV, NIR, IR or Raman spectroscopy.

It is also found that it is desirable to avoid thrombogenesis and heparin adsorption.

Increasingly demanding requirements are being imposed on cellulosic dialysis membranes which are intended to be used for hemodialysis in particular. Thus the membrane must be biocompatible, in other words especially compatible with blood. The complement activation should be as low as possible and the membrane should not exhibit any thrombogenesis. Moreover there is a desire to have cellulosic dialysis membranes available whose ultrafiltration rate (UFR) and screening coefficients can be adjusted for individual applications. Of particular interest in this regard are the so-called "low flux," "middle flux," and "high flux" ranges. In addition the membranes should be resistant to aging, in other words not change their properties when stored; they should be sterilizable using known methods such as steam, ethylene oxide, and radiation treatment. In addition, there is also interest in manufacturing methods that are environmentally safe and can be performed economically, in other words methods in which the environment is not endangered by the disposal of chemicals and which permit high productivity, especially a high production rate.

Important criteria for evaluating the performance of a dialysis membrane are the ultrafiltration rate (UFR) and the screening coefficient (SK).

The ultrafiltration rate is defined as the permeate volume that passes through the membrane wall per unit time, as a function of the membrane area and test pressure (equation 1):

$$UFR = \frac{V}{t \cdot A \cdot p} \frac{\text{ml}}{\text{h} \cdot \text{m}^2 \cdot \text{mmHg}} \qquad \text{Equation 1}$$

V=fluid volume (permeate) [ml]
t=time [h]
A=membrane area [m²]
p=test pressure [mm Hg]

In the case of porous membranes, the separating properties are determined primarily by the pore size. Small molecules, for example urea, can pass with almost no resistance through the membrane wall, medium-sized molecules for example cytochrome C, beta-2-microglobulin, can pass through to a certain percentage, and large molecules, for example albumin, can practically not pass through at all. Hence the characterization of membrane separating properties relies on the determination of the screening coefficients of particle types of different sizes in an ultrafiltration experiment and is defined as the ratio of the concentrations in the filtrate and the stock solution (Equation 2)

$$SK = \frac{C_F}{C_{St}} \qquad \text{Equation 2}$$

$C_F$=concentration of the particle type in question in the filtrate
$C_{St}$=concentration of the particle type in question in the stock solution.

The classic (and still much in use today) method for making cellulosic dialysis membranes is based on the so-called cuprammonium method.

This method permits only a low production rate and these membranes, because of their dense structure, are generally suitable only for the so-called "low flux" range. In addition these membranes age very rapidly. Moreover, according to the cuprammonium method, a number of modified cellulose and/or cellulose derivatives as well as mixtures with synthetic polymers can be processed very poorly if at all.

In addition, the recovery of the chemicals that are used in this method such as ammonia and basic copper sulfate is costly. In addition, there is a significant salt burden, such as sodium sulfate and ammonium sulfate.

Methods have also been described in which such chemicals are not used. DE-C2-3 021 943 discloses a method for making a dialysis membrane out of cellulose in which a spinning solution is made from a mixture of cellulose, a tertiary amine oxide as well as (possibly) diluents that do not dissolve the cellulose and other conventional additives, and this is extruded through a spinneret into a regenerating bath. A dialysis membrane thus forms by coagulation, and must still be washed and dried and wound after adding softeners to prevent shrinkage between 50 and 110° C.

This method however has low productivity; the takeoff speed is very low and there are no specific instructions as to how the pore structure can be influenced and in particular how membranes can be produced that meet the requirements for the low, middle, or high flux ranges. There are also problems with finishing, as will be discussed below. The regenerating bath temperature must also be kept low since otherwise the performance in dialysis is reduced.

The membranes have a very dense structure whose ultrafiltration rate is very low so that they can be used only as so-called "low flux" membranes.

These membranes must be kept in moisture-tight containers since they have a very labile structure and very quickly undergo irreversible structural changes.

Although many methods for making cellulosic membranes are already known, there is still a need for an improved method for making them, including a method for making cellulosic membranes with good or improved properties as well as for making membranes for the low, middle, and high flux ranges.

SUMMARY OF THE INVENTION

One goal of the invention is to provide a method for manufacturing cellulosic dialysis membranes that has a high productivity and is economically feasible, and which produces membranes that can be stored, are resistant to aging under normal conditions and possess a stabile structure. A further goal of the invention is to provide a method for producing membranes suitable for the low, middle, and high flux ranges. A still further goal is to provide a method in which cellulose derivatives, mixtures of cellulose and cellulose derivatives, possibly mixed with synthetic polymers, can be manufactured into biocompatible membranes which can compete as far as many of their properties are concerned with the favorable properties of synthetic membranes. A still further goal is to provide a method in which finally the manufacture of membranes is possible that exhibit an adsorptivity or affinity regarding certain substances present in the blood such as β-2-microglobulin, LDL (low density lipoprotein), or toxins that are not thrombogenic and which are sterilizable, and the structure of the membrane such as porosity and surface quality can be influenced by choosing the polymer composition and concentration as well as the method parameters.

Another goal is to provide a method in which the skeleton of the cellulose undergoes no oxidative damage so the UV spectrum of the polymer material of the resultant membrane dissolved in cadoxene largely corresponds to the UV spectrum of the starting material in the wavelength range from 245 to 320 nm. In other words, the difference between the extinction of the material of the manufactured membrane and the extinction of the starting material is low and preferably is between 0 and 15%.

These and other goals are achieved by a method for producing stable and storable cellulosic dialysis membranes for the low, middle, or high flux ranges with UFR values of 4 to 15, 15 to 50, and more than 50 ml/h m²mm Hg, respectively, in the form of flat, tubular, or hollow fiber membranes by (1) making a spinning solution consisting of, for example, 3 to 40 parts cellulose with a degree of polymerization (DP)>300 and/or modified cellulose with a degree of polymerization (DP)>200, 97 to 60 parts of a mixture of tertiary amine oxide, and one or more additional liquids such as water, dimethylformamide, dimethylacetamide, dimethylsulfoxide, N-methylpyrrolidone, one or more stabilizers as well as possibly one or more pore formers, additional spinning solution additives, and also possibly low molecular weight organic or inorganic compounds and/or synthetic polymers, (2) extruding this solution through a spinneret into a regenerating bath at a temperature of, for example, 10 to 95° C., with an air gap possibly being provided between the spinneret and the regenerating bath surface, and in the case of production of hollow fiber membranes, a cavity-forming fluid is used, with the takeoff speed being at least 30 and preferably at least 50 m/min, (3) single or multiple washing or extraction of the resultant membranes to remove the amine oxide and the soluble additives that may be present to a content of less than 10 ppm. Further possible steps include (4) possible processing of the membranes in a bath that contains one or more pore stabilizers, (5) possibly finishing the membranes as well as drying, and (6) possibly before or after drying, corrugating the membranes and possibly winding them up.

The subject of the invention is also dialysis membranes having desired properties discussed above.

Another subject of the invention is the use of dialysis membranes as low, middle, or high flux membranes especially for hemodialysis, hemofiltration and hemodiafiltration.

DETAILED DESCRIPTION OF PREFERRED EMBODIMENTS

Figure 1:
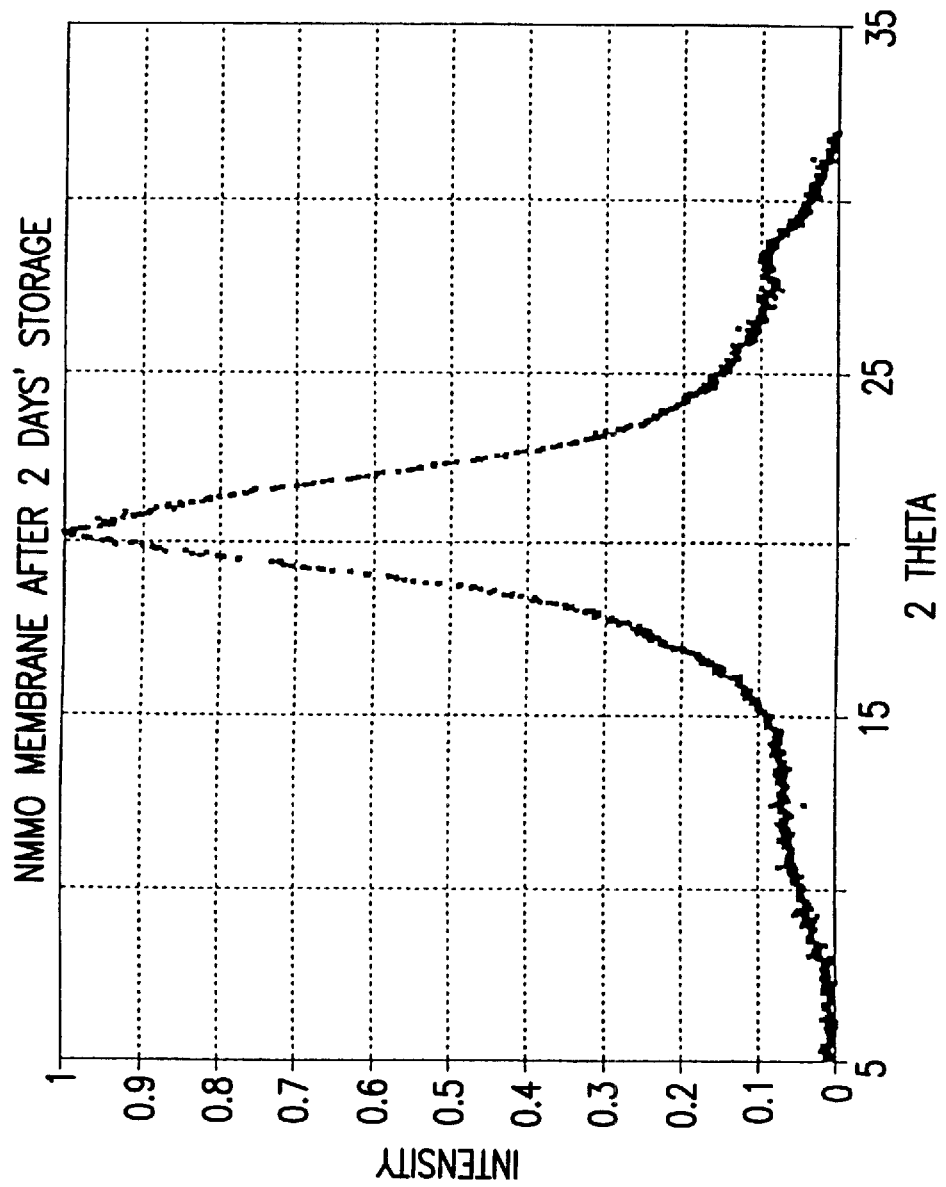
FIGS. 1 and 2 are wide-angle x-ray spectra of isotropized samples according to the invention.

The terms "stable and storable" within the scope of the present invention mean that the membranes do not undergo any significant changes under normal conditions like those that usually prevail in rooms such as patients' rooms, doctors' offices, storage rooms, etc. Therefore they do not have to be kept in moisture-tight containers or in air-conditioned rooms.

The structure of the membrane therefore is established after it is manufactured in such fashion that the membrane is resistant to aging and can be stored for a long time.

The method can be performed at high productivity rates and is very economical to perform since for example high polymer concentrations can be used.

The method produces stable and storable cellulosic dialysis membranes for the low, middle, or high flux range with UFR values of 4 to 15, 15 to 50, or more than 50 ml/h m$^2$mm Hg, respectively, in the form of flat, tubular, or hollow fiber membranes. As the first step in the method, a spinning solution composed of, for example, about 3 to about 40 parts cellulose with a degree of polymerization (DP)>300 and/or modified cellulose with a degree of polymerization (DP) >200, about 97 to about 60 parts of a mixture of tertiary amine oxide and one or more additional liquids such as water, dimethylformamide, dimethylacetamide, dimethylsulfoxide, N-methylpyrrolidone, possibly one or more stabilizers, possibly one or more pore formers, possibly additional spinning solution additives, and possibly low molecular weight organic or inorganic compounds and/or synthetic polymers is produced.

With high degrees of modification, high molecular weights, and high concentrations, the use of a cosolvent can be advantageous for making spinning solutions. Cellulose or cellulose derivatives with lower DP values dissolve more readily and permit high concentrations. The solubility and hence the concentration of the solutions can also be increased by modifying the cellulose or by using mixtures or by mixing cellulosic compounds with different molecular weights.

The spinning solution may also contain 1 to 50 wt. % based on the unmodified or modified cellulose of a synthetic homo- and/or copolymer of acrylic acid esters and/or methacrylic acid esters and/or maleic acid esters with acrylic acid and/or methacrylic acid and/or maleic acid and/or acrylamide and/or methacrylamide and/or vinylbenzene and/or vinyl alcohol, whereby up to 40 mol % free carboxyl groups can be present in the synthetic polymer. In addition, the spinning solution may contain 1 to 50 wt. % of a synthetic polymer of modified and/or unmodified polyacrylonitrile and/or modified and/or unmodified polyamide based on the unmodified or modified cellulose.

The spinning solution optionally may also contain 1 to 50 wt. % of one or more organic, low molecular weight compounds from the group of fatty alcohols, fatty acids, fatty acid esters or fatty amines, based on the dissolved cellulosic and synthetic polymers.

If synthetic polymers or organic low molecular weight compounds are included, the synthetic polymer or organic low molecular weight compound is dissolved in an organic solvent that is miscible with water and/or tertiary amine oxide and is mixed with the cellulose or modified cellulose already dissolved in the tertiary amine oxide, said solution possibly containing additional liquids, stabilizers, pore formers, and other spinning solution additives, before extrusion.

The spinning solution may also optionally contain up to 40 wt. % spinning additive, based on the dissolved cellulosic and synthetic polymers. The spinning additive may be, for example, one or more of gallic acid ester, phosphonate salts, citric acid, ascorbic acid, mannose, glucose, sorbite, maltodextrin, microcrystalline cellulose, glycerin, ethylene glycol, polyethylene glycol, polyvinylpyrrolidone and the like or inorganic salts.

Any suitable method for producing the spinning solution may be employed. Preferred methods include, for example, (1) mixing the components of the spinning solution in a kneader or the like and then feeding the mixture to a device in which the spinning solution is produced by removing water and/or degassing, (2) feeding the components directly to the device for producing a spinning solution, (3) mixing the components for the spinning solution in a kneader or the like at, for example, 65 to 95° C., grinding the mixture after cooling and feeding the ground mixture to a device to produce the spinning solution or (4) producing the spinning solution, i.e., removing water and/or degassing the mixture, in an extruder and/or film extruder and/or in one or more flash evaporation stages, and feeding the resultant spinning solution by a spinning pump to the spinneret to be spun.

After forming the spinning solution, the solution is extruded through a spinneret into a regenerating bath at a temperature of, for example, 10 to 95° C., with an air gap possibly being provided between the spinneret and the surface of the regenerating bath, and with a cavity-forming fluid being used when manufacturing hollow fiber membranes, with the takeoff speed being at least 30, preferably at least 50, and most preferably at least 100 m/min.

If an air gap is provided between the spinneret and the surface of the regenerating bath, the air gap is preferably at least 1 mm, and most preferably at least 5 mm in length.

The extrusion is performed, for example, in a chamber between the spinneret and the regenerating bath, with a conditioned gas or gas mixture being located in the chamber. The conditioned gas is preferably steam or a mixture of steam and gaseous alcohol, ketone, dimethylacetamide, N-methylpyrrolidone, dioxane dimethylsulfoxide and/or dimethylformamide.

The regenerating bath may contain, for example, wholly or partially, water, monovalent or polyvalent alcohols, ketones, dimethylacetamide, N-methylpyrrolidone, dimethylsulfoxide, dimethylformamide, mixtures of these compounds, or aqueous amine oxide or aqueous salt solution.

In a preferred embodiment, the spinneret dips into a regenerating bath that has a temperature of at least 70° C.

The extruded membrane is then subjected to a single stage or multistage washing or extraction to remove the tertiary amine oxide and any soluble additives to a content of preferably less than 10 ppm.

The washing or extraction of the membranes is preferably performed in a bath at a temperature of, for example, 20 to 95° C., preferably 40 to 85° C.

The membranes may also optionally be treated in a bath that contains one or more pore stabilizers. Before drying, the membrane may be treated with an aqueous solution of polyethylene glycol, polyvinylpyrrolidone, and/or multivalent alcohols such as glycerin, ethylene glycol, propanediol, sorbite, glucose, or mixtures thereof. Further, the membranes may optionally be finished according to conventional procedures. In addition, the membrane may be treated before drying with a solution of a cross-linking agent, such as , for example, a compound that contains more than one glycidyl, isocyanate, anhydride, vinyl, and/or other groups that react with OH groups.

The membranes are then dried. Before or after drying, the membranes may optionally be corrugated. The membranes may also optionally be wound up according to conventional procedures.

The tertiary amine oxide is most preferably N-methylmorpholine-N-oxide (NMMO) or dimethylcyclohexylamine-N-oxide.

The modified cellulose preferably has an ether structure, an ester structure, or a carbamate structure.

Modified cellulose having an ether structure is represented by the formula

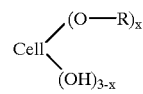

where Cell is the monomer unit of the unmodified cellulose, x corresponds to the degree of etherification which is in the range from 0.001 to 2.60, and R is a possibly substituted alkyl and/or alkenyl and/or cycloalkyl and/or cycloalkenyl and/or arylalkyl and/or arylalkenyl residue, with the carbon chain possibly being interrupted by oxygen or sulfur atoms.

If the residue is substituted, it preferably contains a nonionic group such as OH or OR' and/or SH or SR' and/or CN and/or halogen and/or R', a basic group such as $NH_2$ or NHR' and/or $NR'_2$ and/or piperidine and/or morpholine, an ester group such as COOR and/or $SO_3R$ and/or $Si(OR)_3$ where R'=H, methyl, ethyl, or R.

If the residue contains more than three carbon atoms, it may be substituted by an anionic group such as COOH and/or $SO_3H$ and/or $OSO_3H$ and/or $PO_3H$ and/or $OPO_3H_2$ and/or $Si(OH)_3$ or as the salt.

In the foregoing, R is preferably a benzyl, methylbenzyl, dimethylbenzyl, methoxybenzyl, chlorobenzyl, butyl, hydroxybutyl, hexyl, dodecyl, hydroxydodecyl, octadecyl, 3-butoxy-2-hydroxypropyl, 3-pentoxy-2-hydroxypropyl, 3-phenoxy-2-hydroxypropyl, dodecyl-2-hydroxypropylether, aminoethyl, dimethylaminoethyl, diethylaminoethyl, diisopropylaminoethyl, piperidinoethyl, morpholinoethyl, dimethylaminopropyl, diethylaminopropyl, 3-dimethylamino-2-methylpropyl, triethylammonium ethyl, benzyl-diethylammonium ethyl, sulfobutyl, carboxybutyl, carboxyoctadecyl, cyanoethyl, allyl, isobutyl, mercaptododecyl, dodecylthio-2-hydroxypropyl ether, or phenylthio-2-hydroxypropyl group.

Modified cellulose having an ester structure is represented by the formula

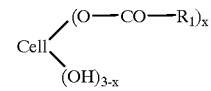

where Cell is the monomer unit of the unmodified cellulose, x corresponds to the degree of sterification which is in the range from 0.01 to 2.60, and $R_1$ is a possibly substituted alkyl and/or alkenyl and/or cycloalkyl and/or cycloalkenyl and/or aryl and/or arylalkyl and/or arylalkenyl residue, and the carbon chain can be interrupted by oxygen or sulfur atoms. Substitution may be the same as set forth above for the ether structure.

$R_1$—CO is preferably the residue of propionic acid, butyric acid, capronic acid, caprylic acid, lauric acid, myristic acid, palmitic acid, stearic acid, arachidic acid, behenic acid, lauroleinic acid, myristoleinic acid, palmitoleinic acid, oleic acid, erucanic acid, linoleic acid, linolenic acid, eleostearic acid, arachidonic acid, erucic acid, acrylic acid, glutaric acid, adipic acid, pimelic acid, suberic acid, azelaic acid, sebacic acid, nonanedicarboxylic acid, undecanedicarbonic acid, dodecanedicarbonic acid, itaconic acid, aconitic acid, 5-norbornene-2,3-dicarbonic acid, dodecenylsuccinic acid, hexadecenylsuccinic acid, isovaleric acid, isocaproic acid, heptanoic acid, sorbinic acid, crotonic acid, 4-chlorobutanic acid, 2-chlorovalerianic acid, phenylacetic acid, benzoic acid, hydroxybenzoic acid, toluic acid, phthalic acid, sulfophthalic acid or naphthalic acid.

Modified cellulose having a carbamate structure is represented by the formula

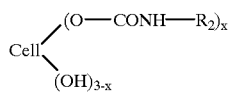

where Cell is the monomer unit of the unmodified cellulose, x corresponds to the degree of modification which is in the range from 0.01 to 2.60, and $R_2$ is an alkyl and/or alkenyl and/or cycloalkyl and/or cycloalkenyl and/or aryl and/or arylalkyl and/or arylalkenyl and/or naphthyl residue, which is possibly substituted with groups as set forth above for the ester structure, and the carbon chain can be interrupted by oxygen or sulfur atoms.

$R_2$—NHCO is preferably the residue of the substituent that results from the reaction of cellulose with butylisocyanate, 2-methylpropylisocyanate, octadecylisocyanate, phenylisocyanate, tolylisocyanate, naphthylisocyanate, cyclohexanisocyanate, chlorophenylisocyanate or chlorotolylisocyanate.

The modification of the cellulose may be performed in accordance with known chemical principles. Preferably, the modification is performed directly in a solution of the tertiary amine oxide.

If a hollow fiber membrane is produced, a hollow fiber spinneret is used and a fluid is used as the internal filling to form the lumen of the hollow fiber membrane. The internal filing for forming the cavity may be, for example, a liquid that boils above 70° C. such as fatty acid ester, paraffin oils, highly concentrated aqueous amine oxide solutions, glycerin, N-methylpyrrolidone, dimethylsulfoxide, dimethylformamide, polyethylene glycol, dimethylacetamide, or aqueous solutions of these compounds or a gaseous substance such as air, nitrogen, or carbon dioxide.

Pores are preferably caused to form in the membrane by the addition of a carbonate to the spinning solution and the use of an acid regenerating bath. Alternatively, pore formation in the membrane may be created by adding an ammonium salt to the spinning solution and using an alkaline regenerating bath.

The cellulosic dialysis membranes formed may have a flat, tubular, or hollow fiber structure.

The difference between the extinction of the cellulose material of the manufactured membrane and the extinction of the cellulosic material used to make the spinning solution is preferably 0 to 15%, more preferably less than 10%, in the wavelength range from 245 to 320 nm.

If the cellulosic dialysis membrane is a hollow fiber membrane, it preferably has one of the following structures:
  an outside wall with a denser structure or a skin with a pore size of less than 10 nm, a porous inside wall, with the pores of the inside wall being larger than the pores in the outside wall, and the area of the membrane located between the inside and outside walls is porous;
  a porous outside wall and an inside wall with a denser structure or a skin with a pore size of less than 10 nm, with the pores of the outside wall being larger than the pores of the inside wall, and the area between the inside wall and the outside wall is porous;
  an outside wall and an inside wall with a denser structure or a skin with a pore size of less than 10 nm, and the area located between the inside wall and the outside wall is porous;
  a porous outside and inside wall and the area between the inside wall and the outside wall is porous; or
  a structure with pores less than 10 nm throughout.

The cellulosic dialysis membrane may be a low flux range membrane having an ultrafiltration rate of 4 to 15 ml/h m²mm Hg, a middle flux range membrane having an ultrafiltration rate of 15 to 50 ml/h m²mm Hg, or a high flux range membrane having an ultrafiltration rate of 50 to 500, preferably 60 to 300, ml/h m²mm Hg. The membrane preferably has groups with an affinity for absorption as discussed above.

The method makes it possible, by varying individual or several parameters deliberately and reproducibly, to influence the properties and the structure of the membranes. Thus for example the ultrafiltration rate (UFR) can increase with rising regenerating bath temperature.

In addition, the structure and of course the UFR can also be influenced by the composition of the regenerating medium. Thus, by means of hydrophily of the regenerating agent, the structure of the surface of the membranes can be controlled in particular. Thus more hydrophilic regenerating agents, especially water, produce a thicker skin while materials that are more hydrophobic such as isopropyl myristate produce open-pored, more porous surfaces. Depending on the nature of the regenerating or coagulating agent, hollow fiber membranes can be produced for example that have a denser structure on the outside wall and/or the inside wall. In the same fashion as by the composition of the regenerating bath acting externally, the structure of the inner surface of hollow fiber membranes can also be influenced by the composition of the fluid that forms the cavities.

In addition, the structure of the membranes can be influenced by the concentration of the spinning solution as illustrated in several examples.

Conditioning the air gap also provides a means of affecting the formation of the structures.

Finally, finishing, in other words especially the composition of the finish, can contribute to formation of structures and fixing of the latter.

The combination of individual parameters provides a tool for adjusting the properties of the membrane optimally for the intended purpose.

Thus it is particularly surprising that dialysis membranes of outstanding quality can be manufactured according to the invention in a simple fashion which can be adjusted as desired for the low, middle, or high flux ranges. They have a stable structure and therefore do not have to be stored under special conditions, which is a great advantage as far as shipment and storage are concerned. Since the membranes do not change their structures for a long period of time, the UFR as well as dialysis performance remain constant even with prolonged storage.

The cellulose and cellulose derivatives can be processed very well according to the invention when mixed with synthetic polymers to make membranes. In addition, low molecular weight compounds, for example fatty alcohols such as stearyl alcohol, fatty oils, and the like can be used according to the invention in an outstanding fashion and the compatibility with blood can be improved as a result. Such components also do not have to be extracted during washing since they are not toxic and are hardly soluble in the blood.

The membranes have a favorable porosity and can be given a sharp dividing barrier. Thus for example it is possible to make dialysis membranes that allow beta-2-microglobulin to pass through but are impermeable to higher molecular weight proteins.

In addition, mixtures of celluloses or cellulose derivatives with different molecular weights can be processed according to the invention.

It is also possible within the scope of the invention to produce modified membranes with very good biocompatibility, in other words those which produce less leukopenia and less complement activation. These membranes are also less thrombogenic.

The invention will now be explained in greater detail with reference to the following examples:

EXAMPLE 1

23.982 kg of N-methylmorpholine-N-oxide (NMMO), 1.800 kg of linters cellulose, 5.996 kg completely softened (CS) water and 0.018 kg of gallic acid propyl ester are kneaded at 80° C. for 30 minutes. The homogenous mixture is first deep-frozen, then ground and loaded into a supply container connected to a double-screw extruder with two degassing zones and screws turning in the same direction. The pulverized mixture is fed continuously through a metering double screw to the extruder, heated to 100° C. The melt is degassed in the degassing zones at a pressure of 100 mbar, with air and a total of 1.796 kg of water being removed. The resultant spinning solution is filtered and supplied by a metering pump to a hollow fiber spinneret heated to 120° C., said spinneret being located at a distance of 70 mm above the surface of the regenerating bath. The outside diameter of the spinneret hole is 1140 microns, and that of the core needle is 830 microns. Isopropyl myristate is used as the hollow-forming fluid. CS water at 40° C. is used as the regenerating bath. The takeoff speed is 200 m/min and the draft 6.68. The hollow fibers are first washed with CS water, then treated with a solution of 30 wt. % glycerin, 20 wt. % isopropanol, and 50 wt. % water and dried at 50° C. The hollow fibers obtained in this manner exhibit the following properties:

|  |  |  |
|---|---|---|
| strength (cN/tex) | dry: | 17.5 |
|  | wet: | 9.5 |
| Elongation (%) | dry: | 11.5 |
|  | wet: | 9.8 |
| Modulus (cN/tex) | dry: | 415 |
|  | wet: | 120 |
| Crystallite orientation in lengthwise direction of hollow fiber: |  | 0.93 |
| Crystal Content (%); |  | 75 |
| Ratio of crystallite length to crystallite width: |  | 3 |
| Inside diameter (microns): |  | 200 |
| Wall thickness (microns): |  | 18 |
| UFR water (ml/h m²mm Hg) |  |  |
| after 2 days' storage: |  | 70 |
| after 100 days' storage: |  | 65 |
| Screening coefficient, cytochrome C |  |  |
| after 2 days' storage: |  | 0.85 |
| after 100 days' storage: |  | 0.80 |
| Screening coefficient, albumin |  |  |
| after 2 days' storage: |  | 0.08 |
| after 100 days' storae: |  | 0.05 |

Figure 2:
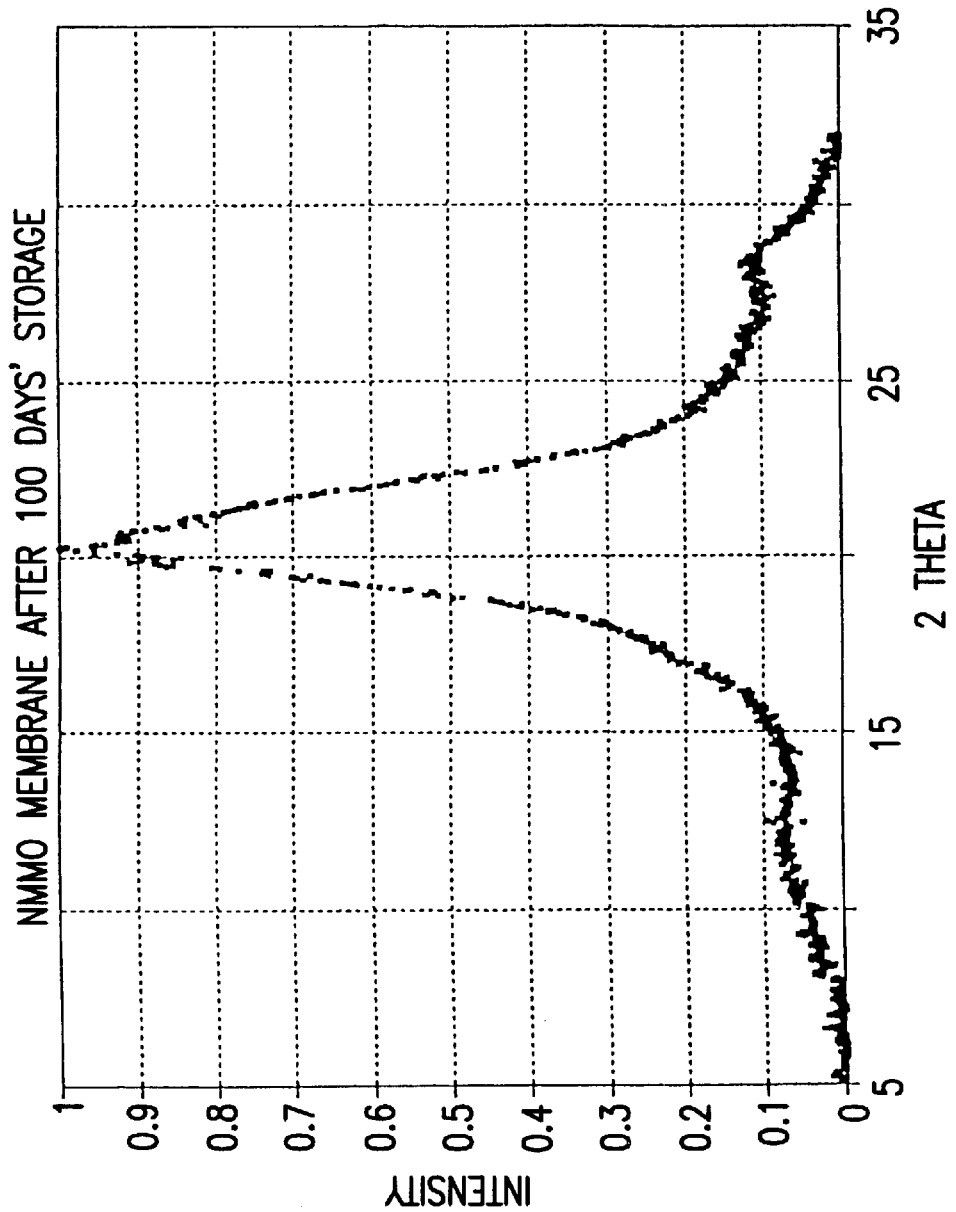
Figure 3:
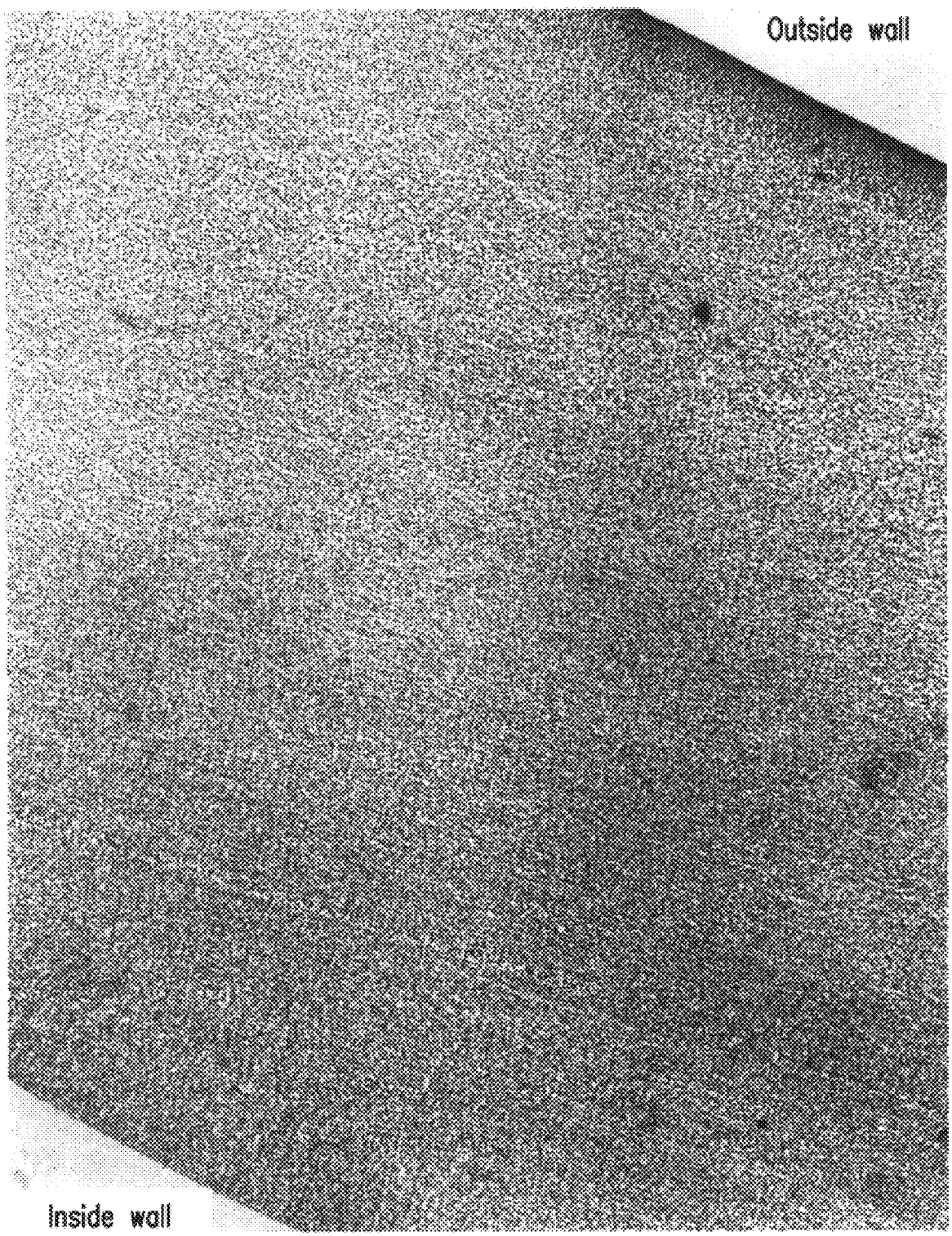
FIGS. 3–7 are microscopic photographs of a porous membrane with skin formation on the outside.
Figure 4:
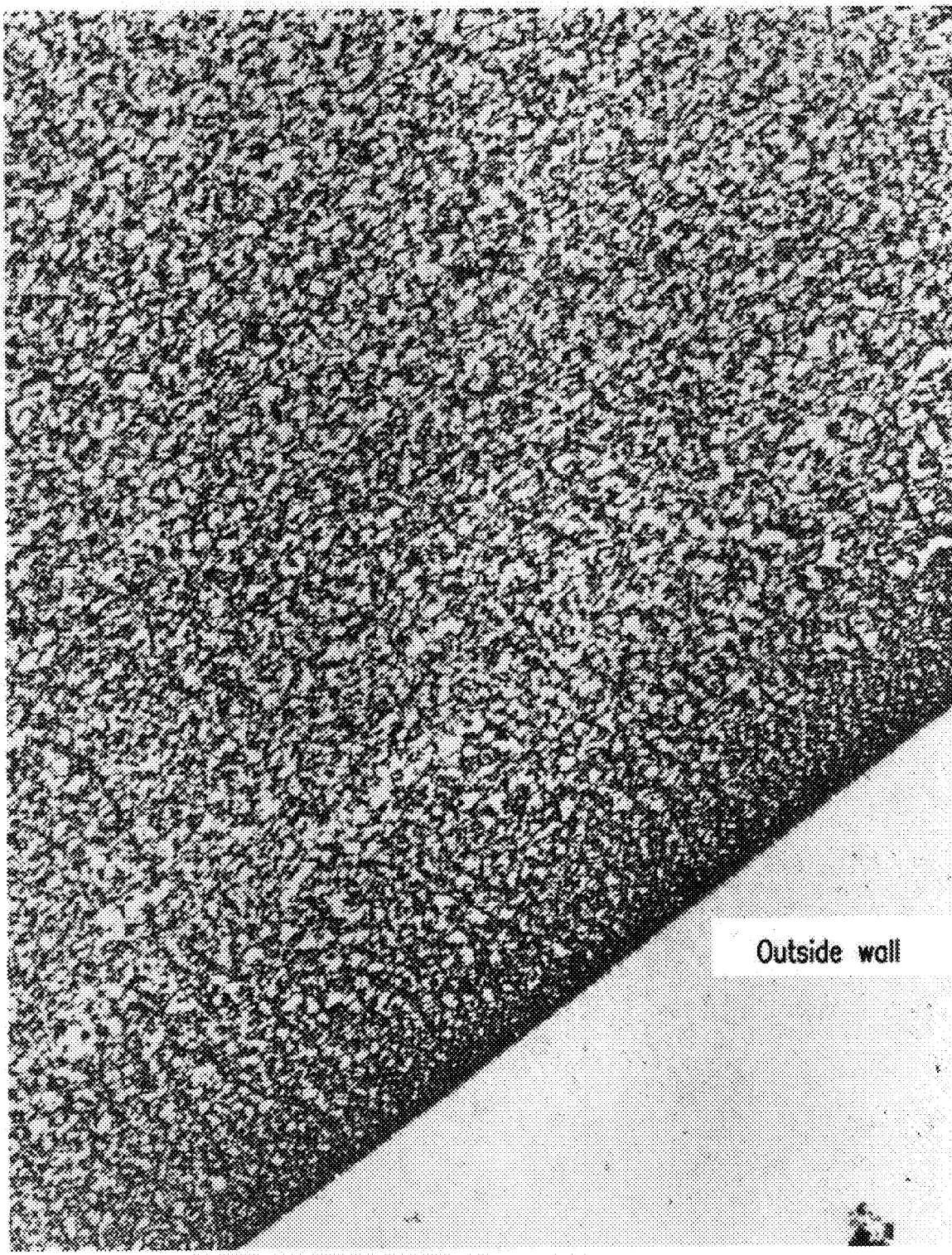
Figure 5:
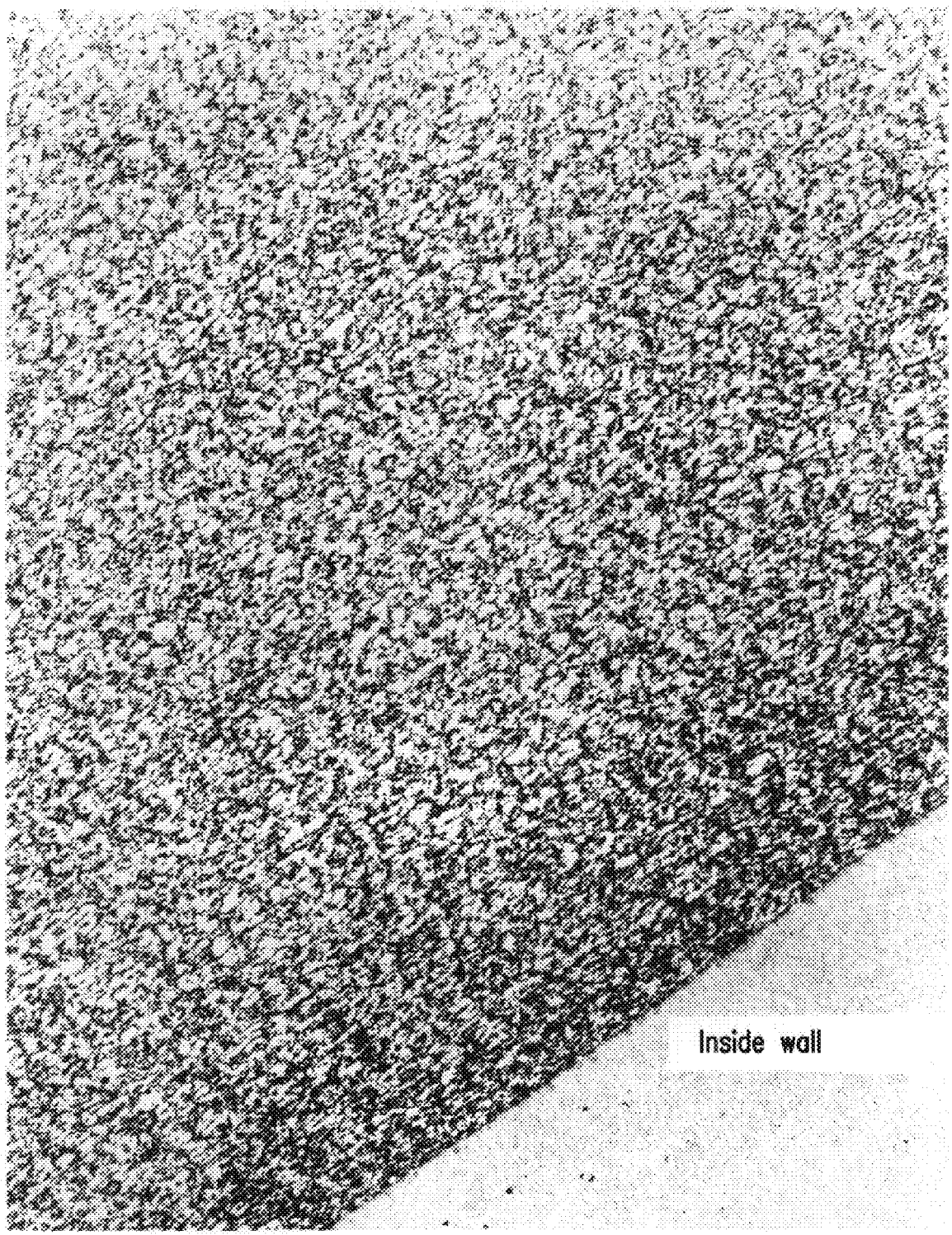
Figure 6:
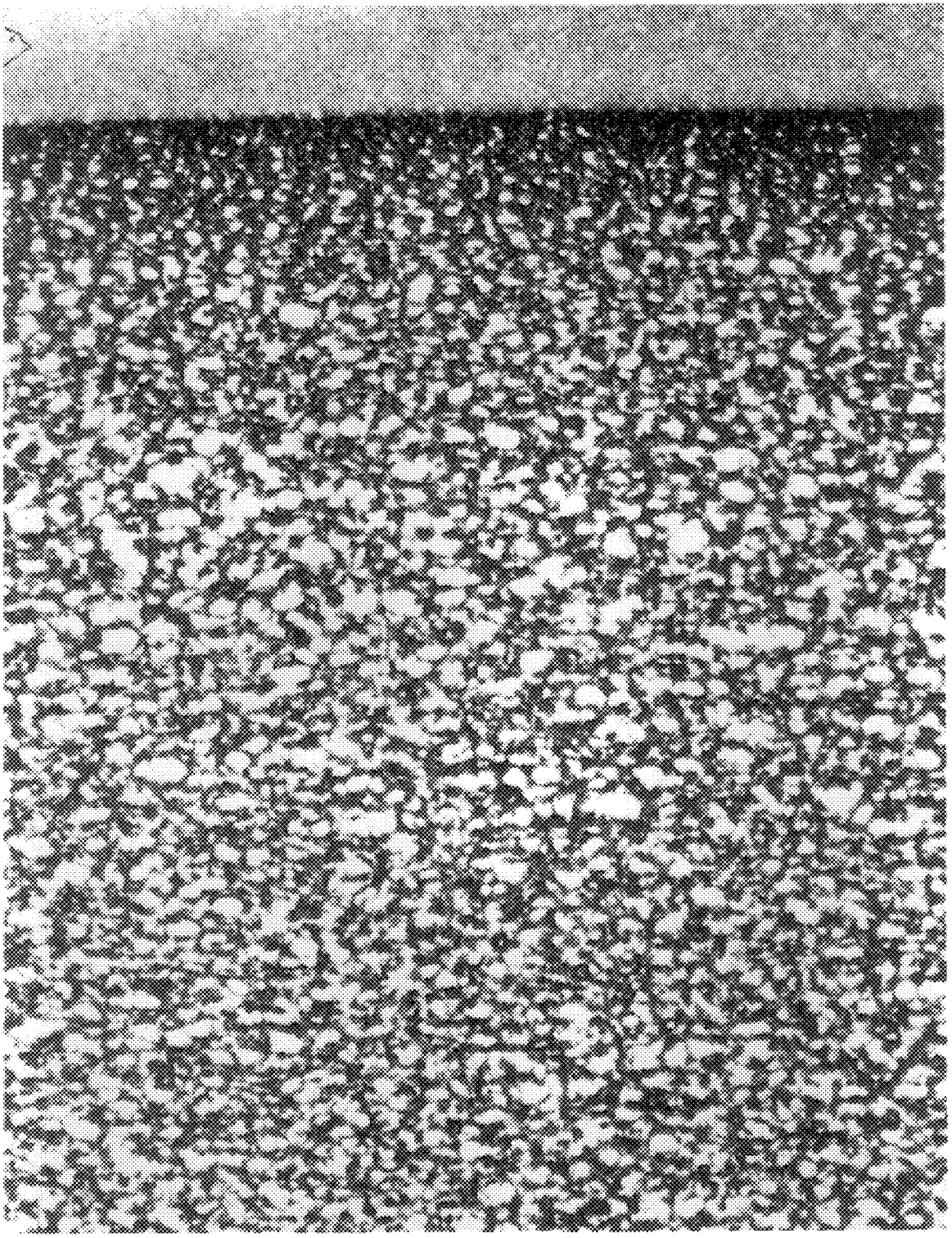
Figure 7:
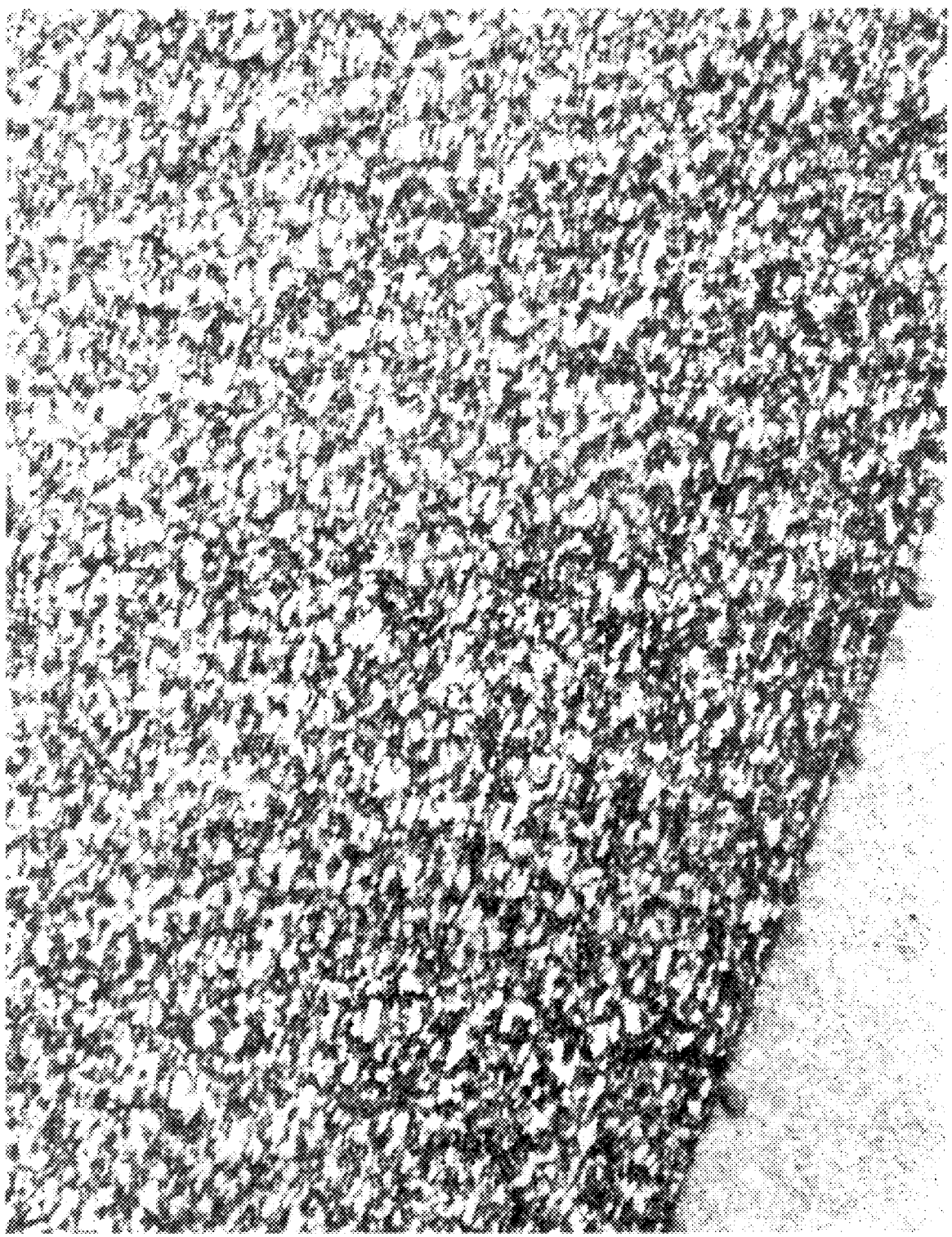

Wide-angle x-ray spectra of isotropized samples (containing glycerin) are recorded after the second and 100th days of storage in transmitted light to evaluate the influence of aging on crystallinity and crystallite dimensions (FIGS. 1 and 2). The spectra indicate that the membranes are stable with respect to aging as far as the above parameters are concerned.

Microscopic studies (see FIGS. 3, 4, 5, 6, 7) indicate a porous membrane with skin formation on the outside.

The samples are embedded in nanoplast to determine the porosity and pore size of capillary membranes. Then sections approximately 90 nm thick are prepared on an ultramicrotome.

The sections are studied under a transmission microscope (Philips CM12) and photographed at an enlargement of 55,000:1 over the entire cross section of the membrane.

The cross section photographs are evaluated using computer image analysis (Quantimeter 970) for the parameters of free pore area and average free path length.

Figure 8:
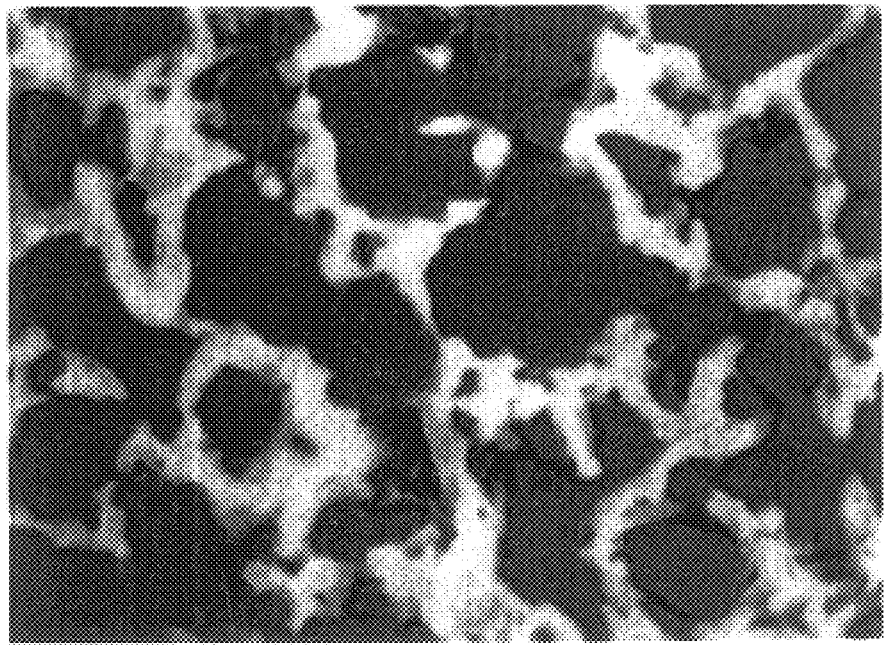
FIGS. 8 and 9 are cross-section photographs of a membrane according to the invention and used to determine free pore area and average free path length.

The free pore area $F_p$ (FIG. 8) is calculated according to equation 3:

$$F_p = \frac{\text{pore area}}{\text{total area}} \qquad \text{Equation 3}$$

Figure 9:
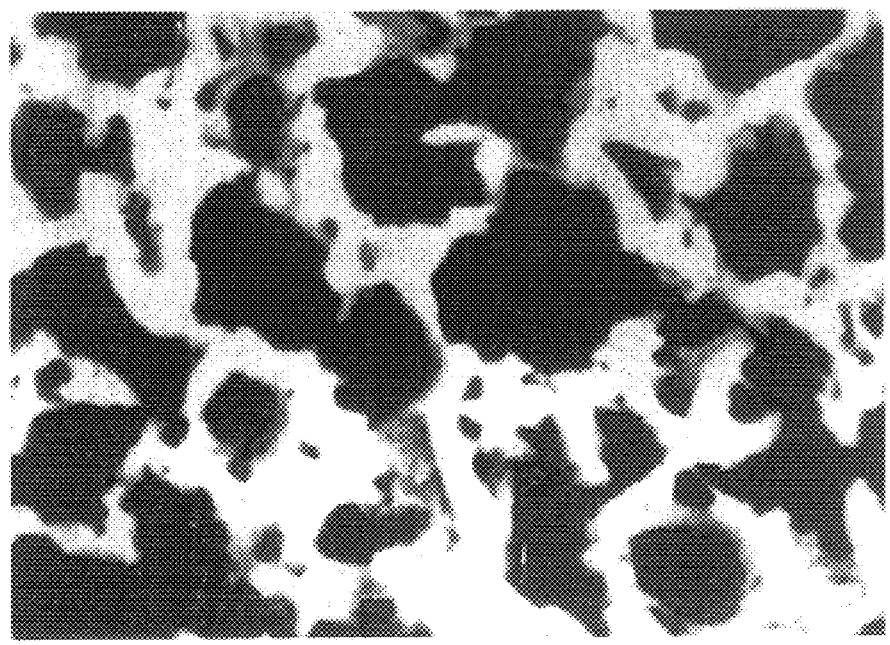

The average free path length A in the pore structure is determined for the pore size, which is defined as the average of the distances between the pore boundaries. A large number of parallel measuring lines (FIG. 9) are applied to measure it using image analysis and their length distribution within the areas identified as pores is determined.

Figure 10:
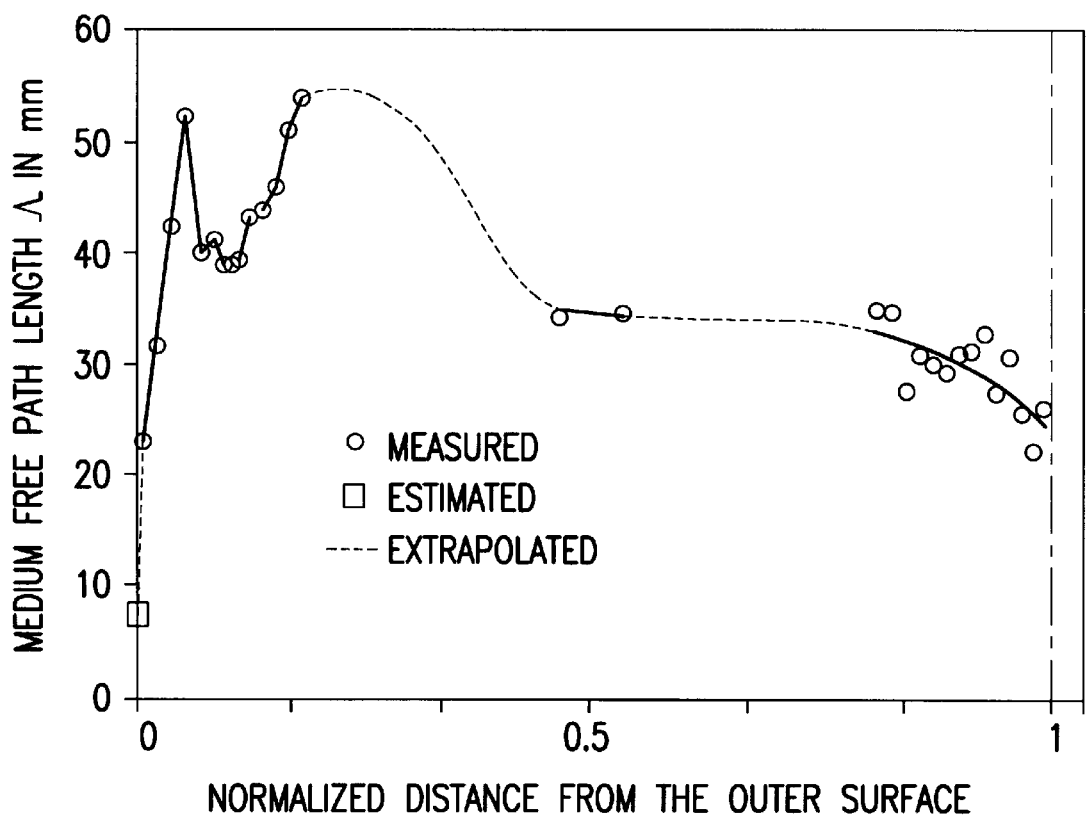
FIG. 10 shows the pattern of pore size in a hollow fiber membrane according to the invention.

FIG. 10 shows the pattern of pore size in a hollow fiber membrane according to the invention. The skin on the outside has only tiny pores directly on its surface whose size is less than 10 nm. The pore size rapidly increases to more than 50 nm in the direction of the inside wall and then changes to about 30 nm on the inside wall corresponding to the curve. The pores on the surface of the inside wall are clearly larger than those on the skin of the outside wall. A large number of pores, calculated from the inside wall, in other words, more than 75%, are larger than the pores on the inside wall.

Figure 11:
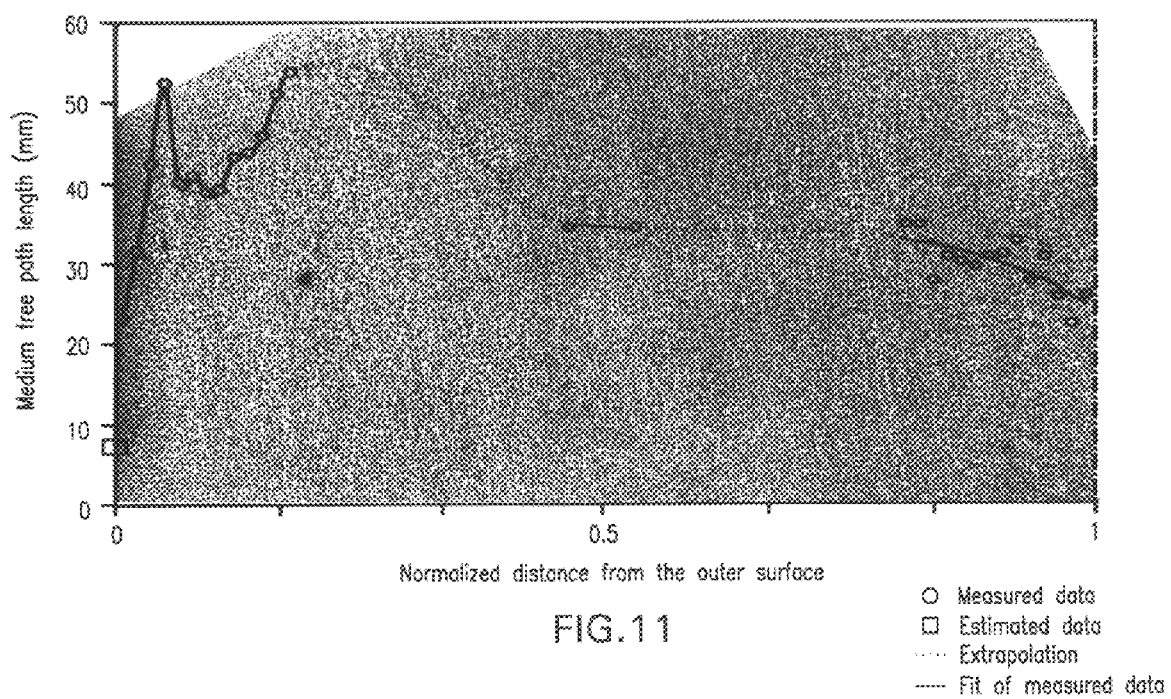
FIG. 11 shows the same curve pattern plotted on a membrane section as the background.

FIG. 11 shows the same curve pattern plotted on a membrane section as the background.

Figure 12:
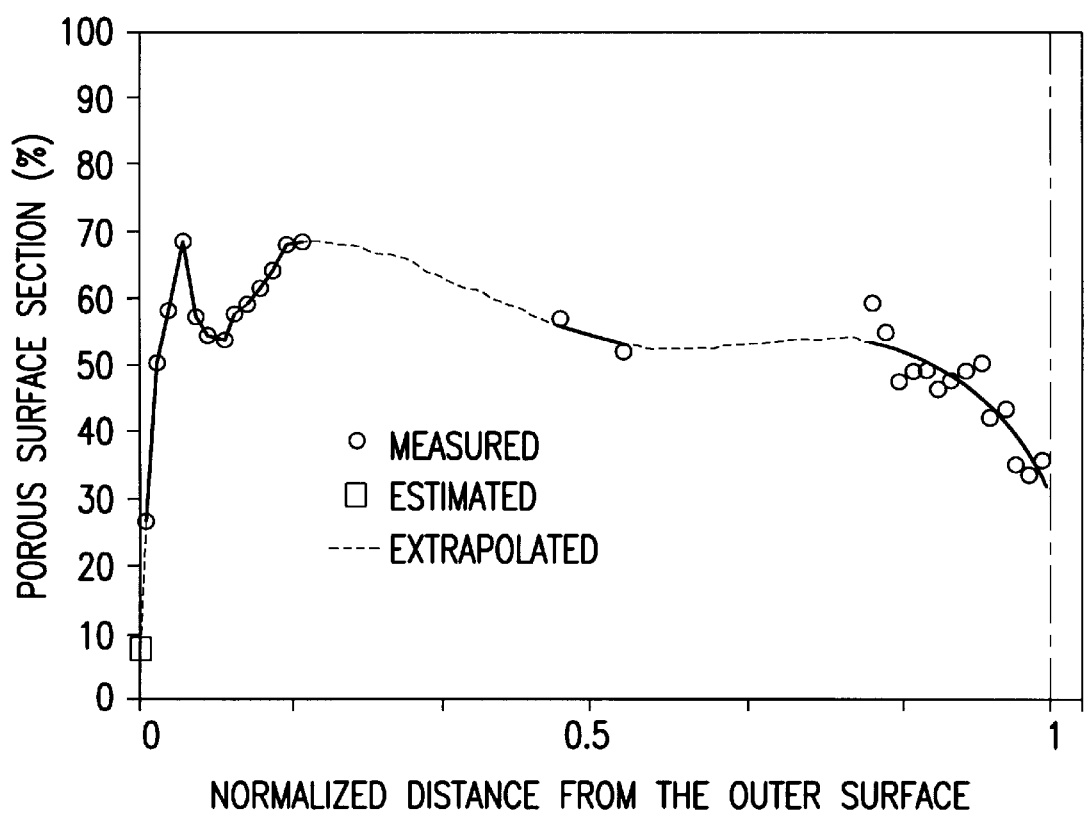
FIG. 12 shows the porous area of the hollow fiber membrane.

FIG. 12 shows the porous area. The porosity on the outside surface is extremely low, then increases rapidly, like the pore size, and then drops off to about 40%. From this it is evident that the inside surface is porous while the outside surface is much denser.

Figure 13:
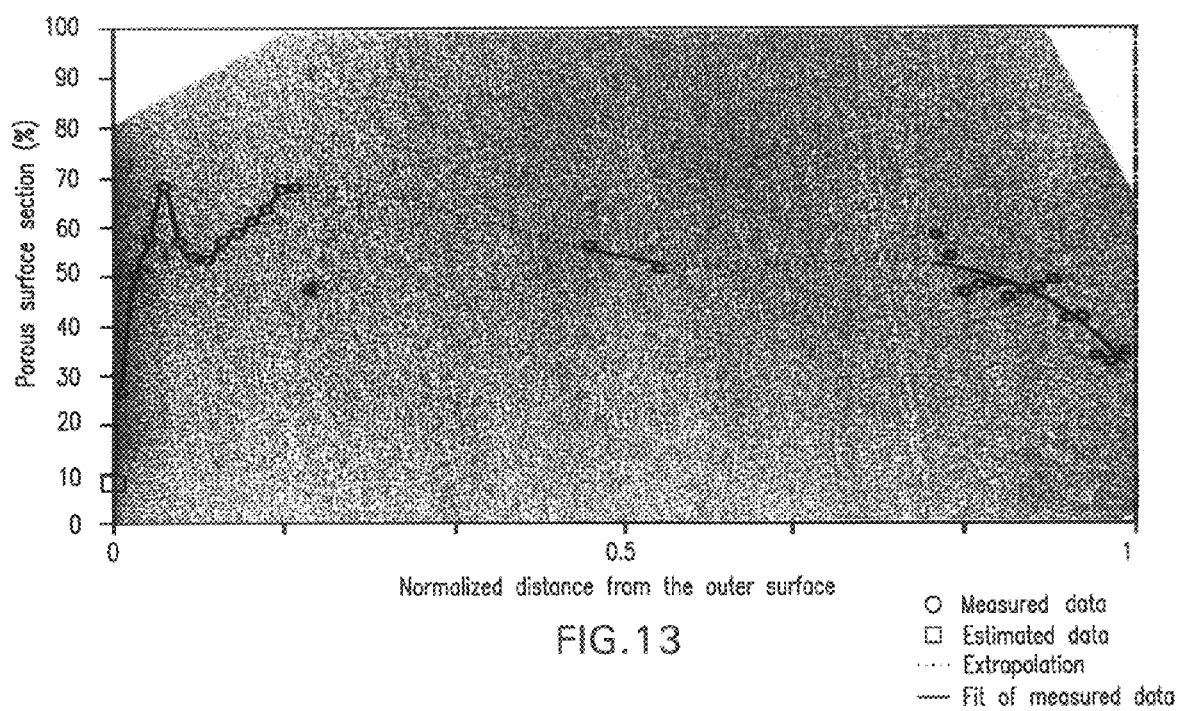
FIG. 13 shows the same curve for a membrane section as the background.
Figure 14:
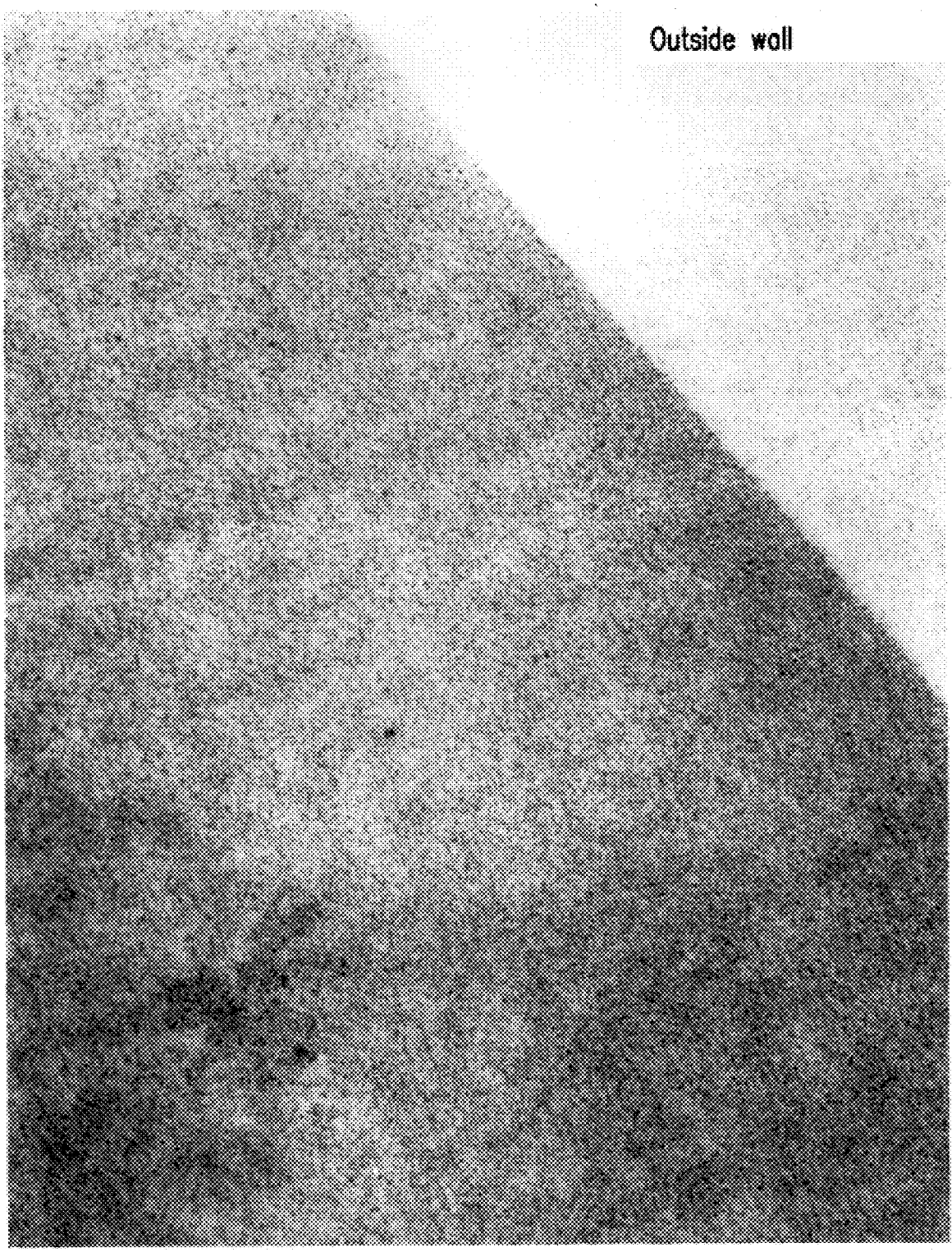
FIGS. 14–17 are microscopic photographs of a very dense comparative membrane of Comparative Example 1.
Figure 15:
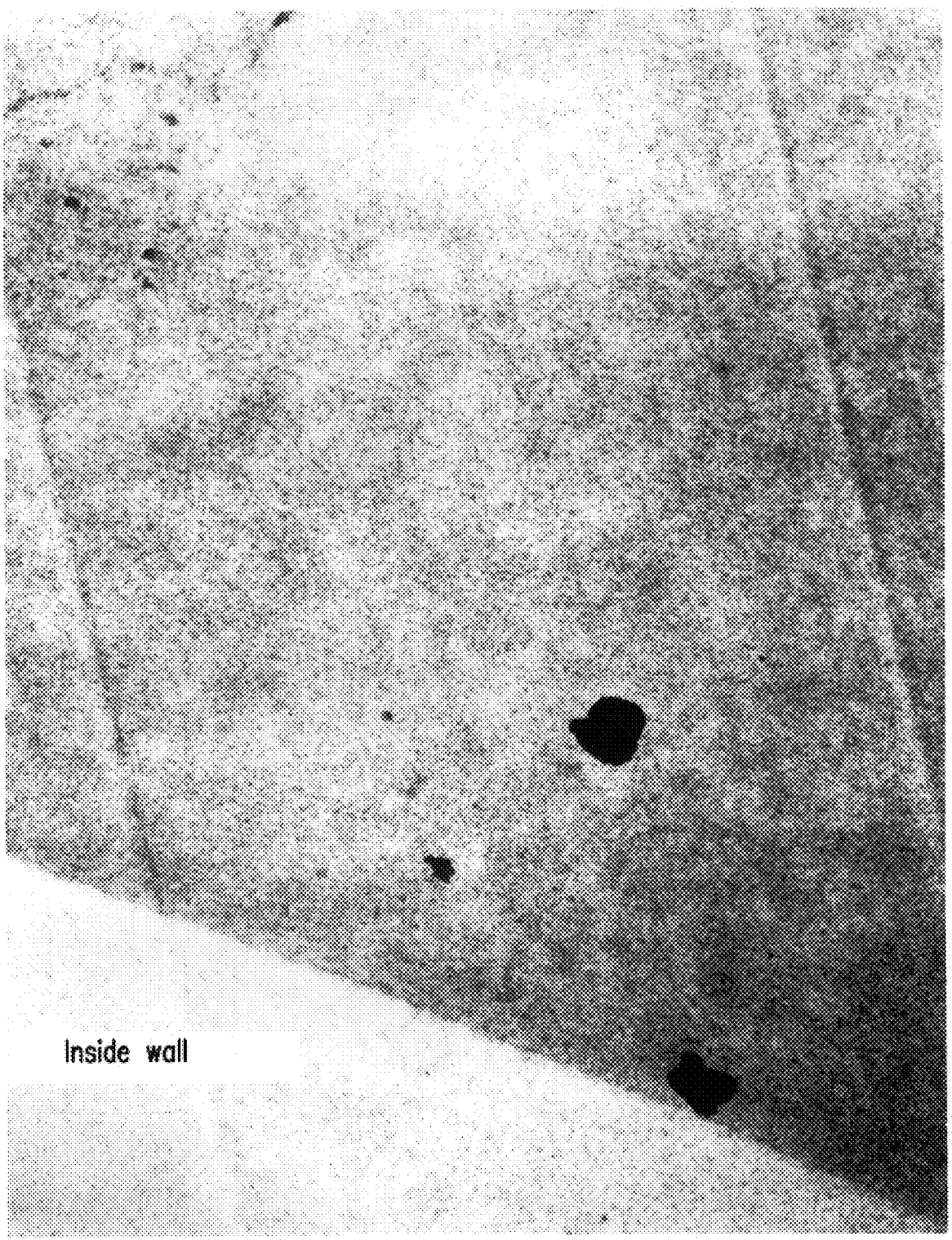
Figure 16:
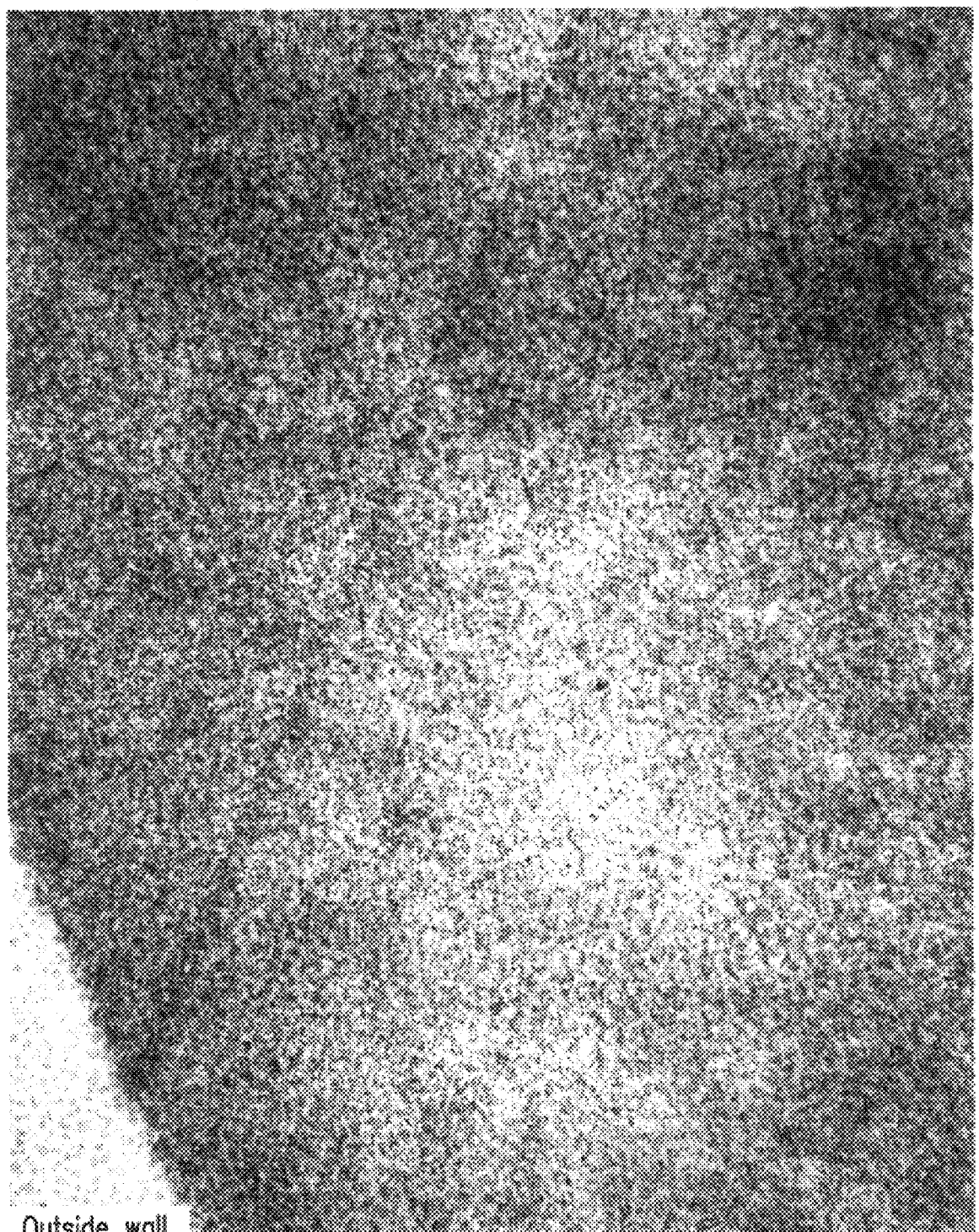
Figure 17:
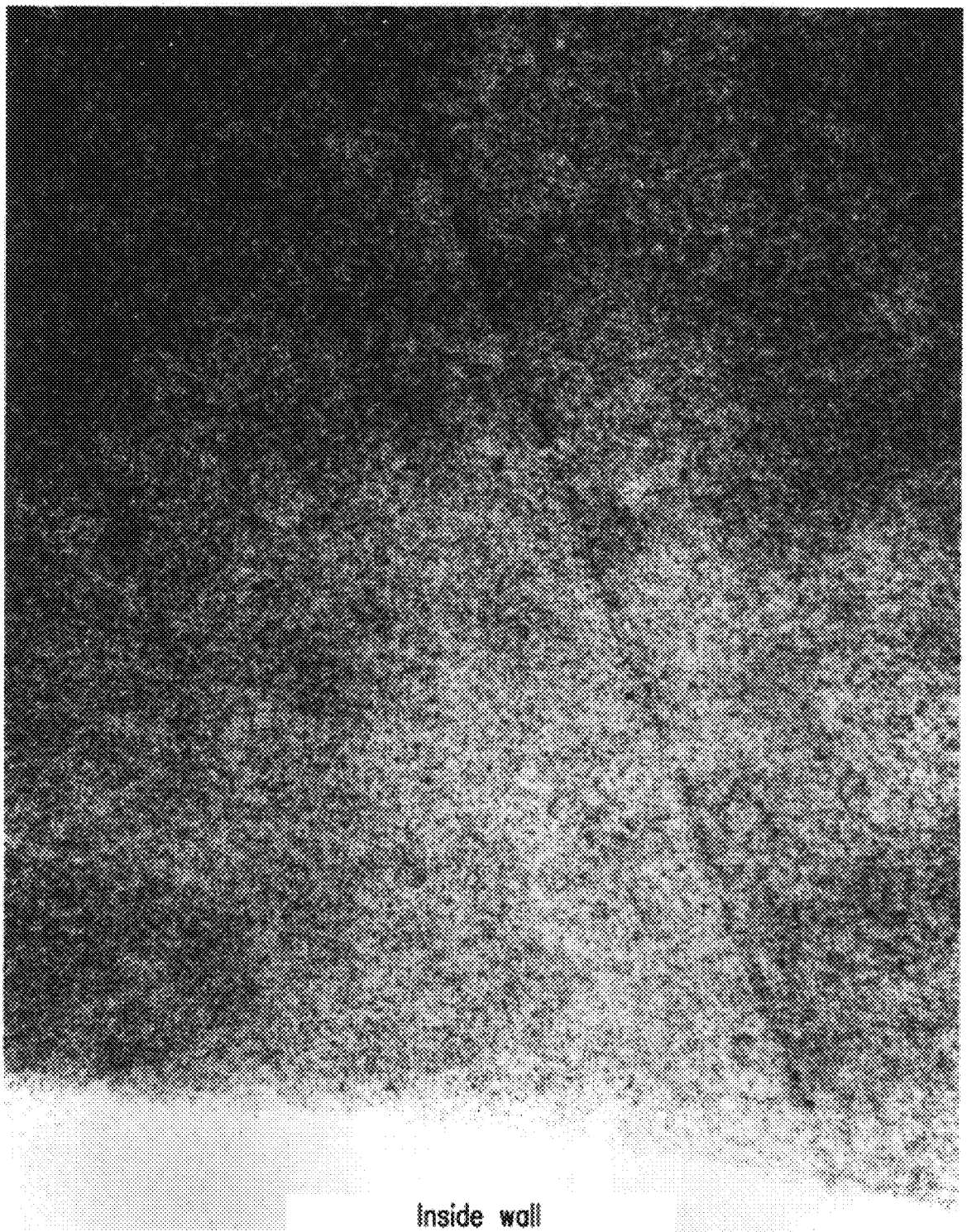

FIG. 13 shows the same curve for a membrane section as the background.

Comparison Example

In an attempt to repeat Example 3 of DE-C2-3 021 943, it is not possible to obtain a spinnable solution with the cellulose of DP 795 referred to therein. Therefore, a 14% and a 17% solution is prepared but otherwise proceeded in accordance with the directions given in Example 3. The following membrane properties are found:

|  | 14 | 17 |
|---|---|---|
| cellulose content of spinning solution (%) |  |  |
| draft | 4.8 | 4.5 |
| UFR water, after 2 days' storage | 8.5 ml/h m²mm Hg | 2.4 |
| screening coefficient, cytochrome c after 2 days' storage | 0.15 | 0.08 |
| screening coefficient, albumin after 2 days' storage | 0.02 | 0.02 |
| crystallite orientation: |  | 0.87 |
| crystal component (%): |  | 50 |
| ratio of crystallite length to crystallite width: |  | 3.25 |

The microscopic examination (see FIGS. 14, 15, 16, and 17) also confirms that this is a very dense membrane. The pore sizes could only be estimated and are far smaller than 10 nm. The porosity could not be determined using computer image analysis because of the very small pores.

EXAMPLE 2

23.982 kg of NMMO, 1.800 kg of linters cellulose, 5.996 kg CS water and 0.018 kg of gallic acid propyl ester are kneaded at 80° C. for 30 minutes. The homogenous mixture is first deep-frozen then ground and loaded into a supply container connected to a double-screw extruder with two degassing zones and screws turning in the same direction. The pulverized mixture is fed continuously through a metering double screw to the extruder, heated to 100° C. The melt is degassed in the degassing zones at a pressure of 100 mbar, with air and a total of 1.796 kg of water being removed. The resultant spinning solution is filtered and supplied by a metering pump to a hollow fiber spinneret heated to 120° C., said spinneret being located at a distance of 70 mm above the surface of the regenerating bath. The outside diameter of the spinneret hole is 1140 microns, and that of the core needle is 830 microns. Isopropyl myristate is used as the hollow-forming fluid. CS water at 40° C. is used as the regenerating bath. The takeoff speed is 200 m/min and the draft 9.43. The hollow fibers are first washed with CS water then treated with a solution of 15 wt. % glycerin, 35 wt. % isopropanol, and 50 wt. % water and dried at 50° C. The hollow fibers obtained in this manner exhibit the following properties:
inside diameter (microns): 195
wall thickness (microns): 20
UFR water (ml/h m²mm Hg): 33
screening coefficient
  cytochrome C: 0.64
screening coefficient
  albumin: 0.05

EXAMPLE 3

Figure 18:
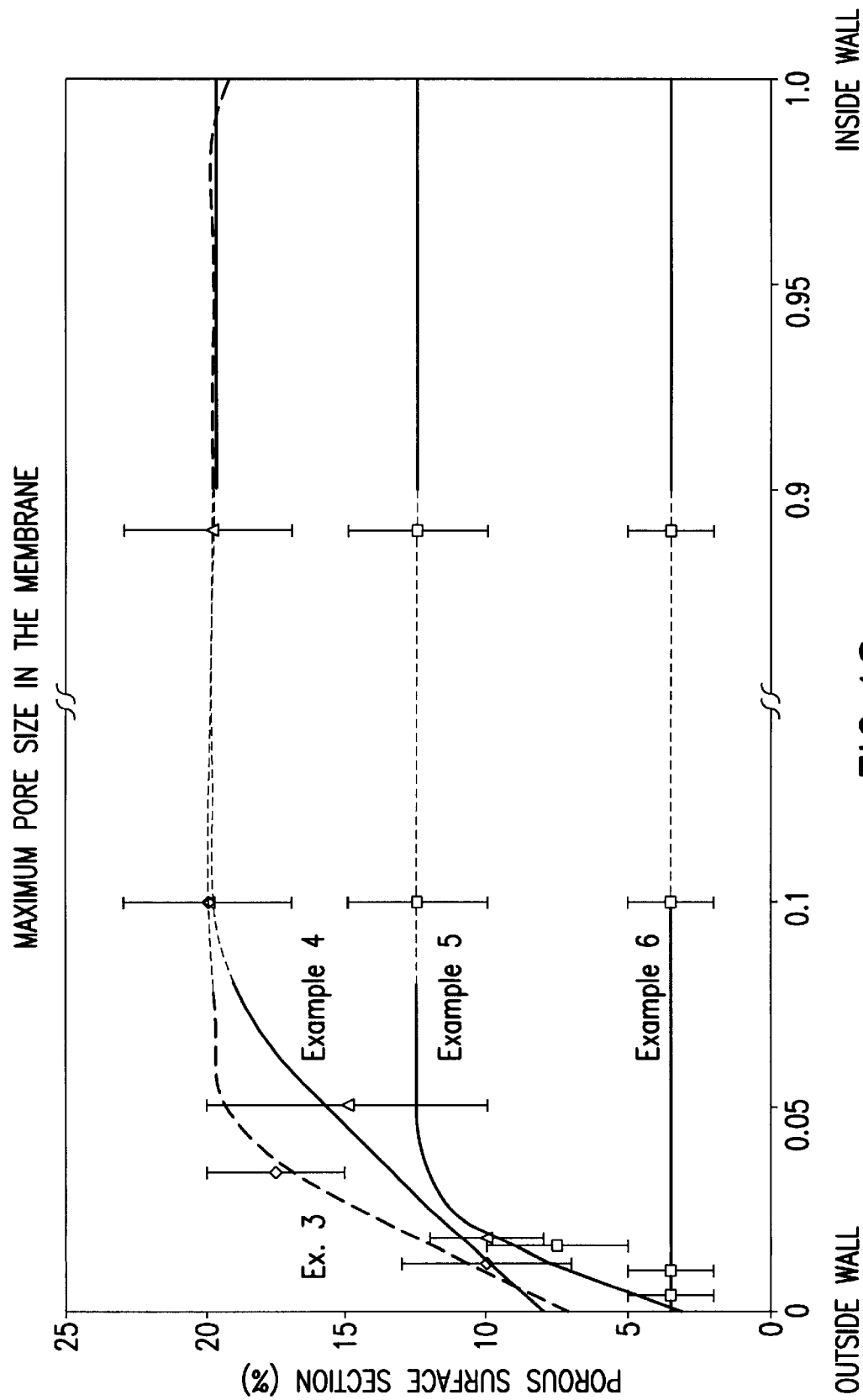
FIG. 18 is a graph of the porous structure of the membranes of Examples 3–6 of the invention.
Figure 19:
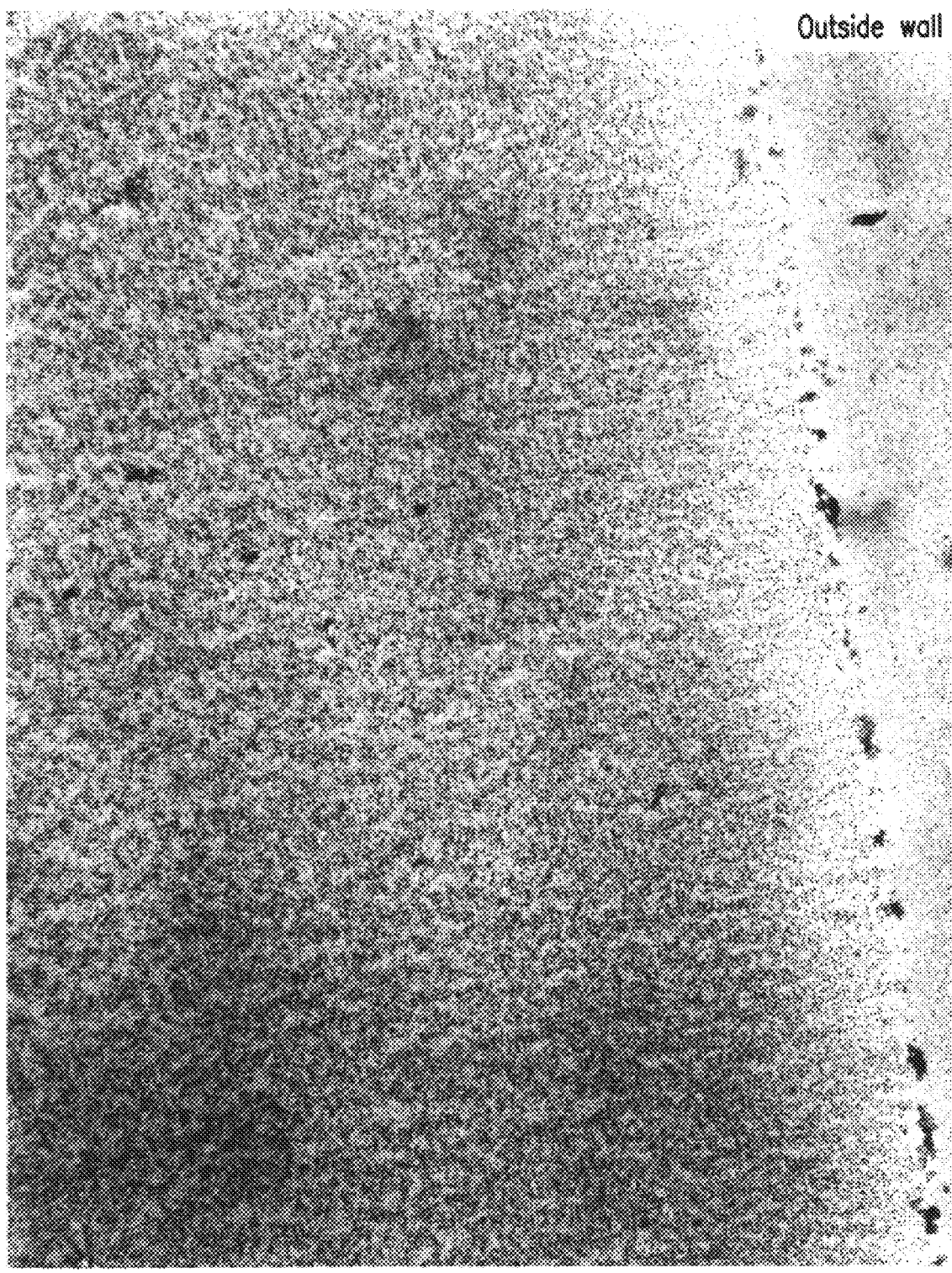
FIGS. 19 and 20 are photographs showing the porous structure of the membrane of Example 3.
Figure 20:
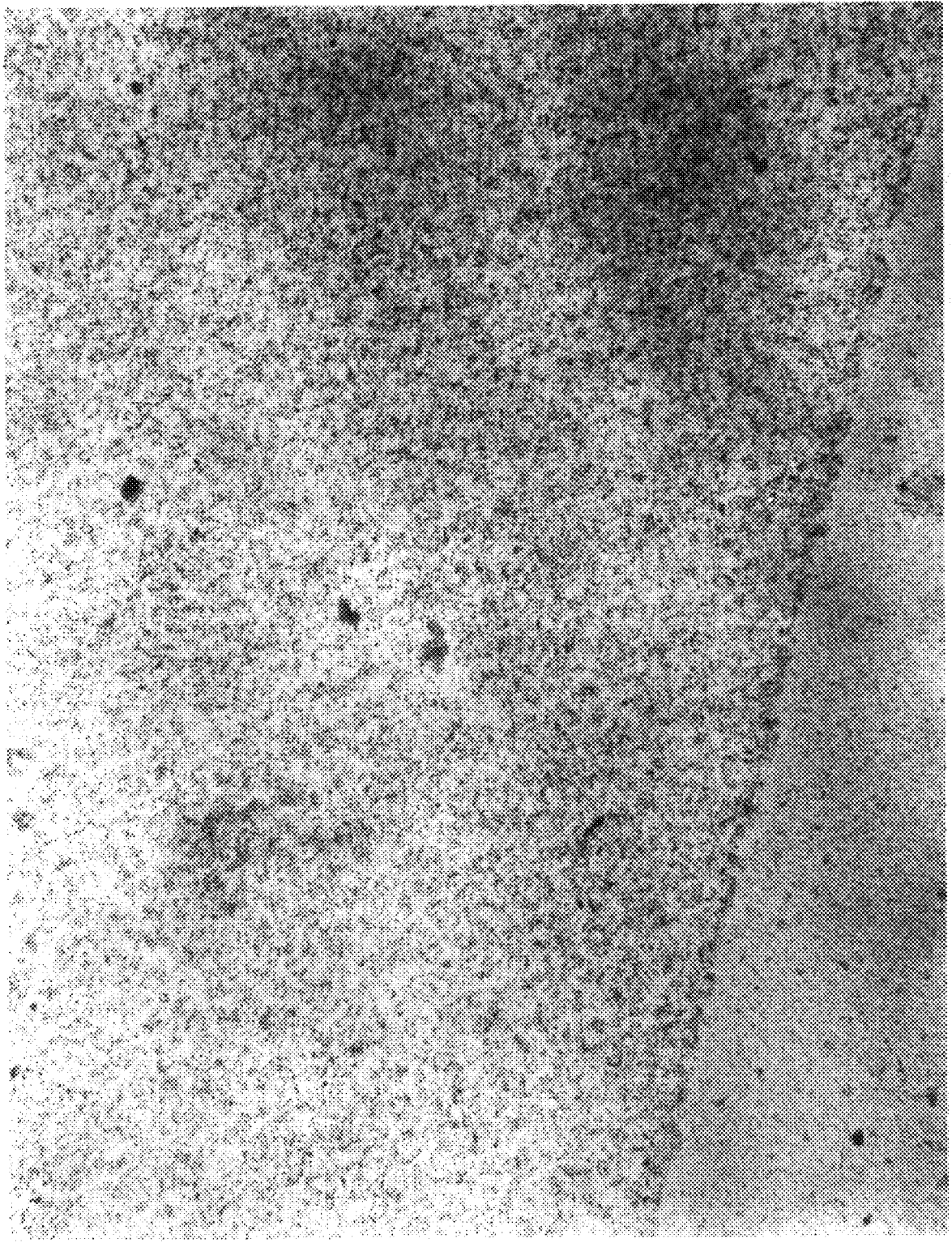

23.982 kg of NMMO, 1.350 kg of linters cellulose, 0.450 benzylcellulose with a DS of 0.24, 5.996 kg CS water and 0.018 kg of gallic acid propyl ester are kneaded at 80° C. for 30 minutes. The homogenous mixture is first deep-frozen then ground and loaded into a supply container connected to a double-screw extruder with two degassing zones and screws turning in the same direction. The pulverized mixture is fed continuously through a metering double screw to the extruder, heated to 100° C. The melt is degassed in the degassing zones at a pressure of 100 mbar, with air and a total of 1.796 kg of water being removed. The resultant spinning solution is filtered and supplied by a metering pump to a hollow fiber spinneret heated to 120° C., said spinneret being located at a distance of 110 mm above the surface of the regenerating bath. The outside diameter of the spinneret hole is 1140 microns, and that of the core needle is 830 microns. Isopropyl myristate is used as the hollow-forming fluid. CS water at 40° C. is used as the regenerating bath. The takeoff speed is 200 m/min and the draft 9.43. The hollow fibers are first washed with CS water then treated with a solution of 15 wt. % glycerin, 35 wt. % isopropanol, and 50 wt. % water and dried at 50° C. The hollow fiber obtained using this method has a porous structure with a maximal pore size of 15 to 20 nm and a somewhat thicker though still open outer and inner surface (see FIGS. 18, 19, and 20) and exhibits the following properties:
inside diameter (microns): 195
wall thickness (microns): 24
UFR water (ml/h m²mm Hg): 57
screening coefficient, cytochrome C: 0.66
screening coefficient, albumin : 0.016

The capillary membranes are prepared into test bodies (dialyzers) with a surface area of 1.2 m² and their biocompatibility properties are tested. The following results are obtained:

| | | |
|---|---|---|
| $C_{5a}$ activation (ng/ml): | 19 | (N = 9) |
| TAT (ng/ml): | 15 | (N = 9) |
| PC (%): | 85 | (N = 9) |
| Heparin (U/ml): | 4.1 | (N = 9) |
| Cuprophan (comparison) | | |
| $C_{5a}$ activation (ng/ml): | 601 | (N = 9) |
| TAT (ng/ml): | 17 | (N = 9) |
| PC (%): | 77 | (N = 9) |
| Heparin (U/ml): | 4.0 | (N = 9) |

It is clear from these results that the modified membranes demonstrate very good biocompatibility.

EXAMPLE 4

Figure 21:
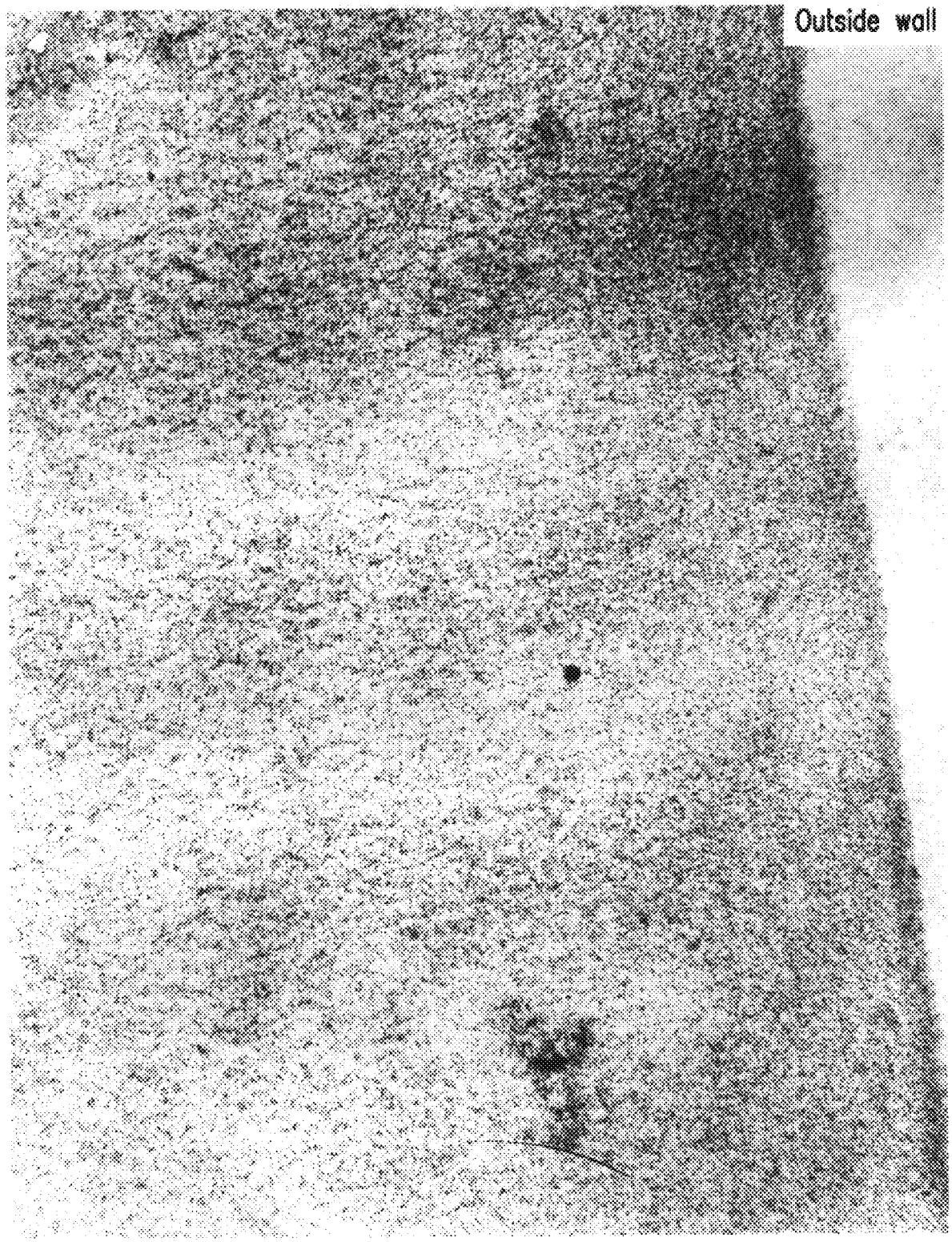
FIGS. 21 and 22 are photographs showing the porous structure of the membrane of Example 4.
Figure 22:
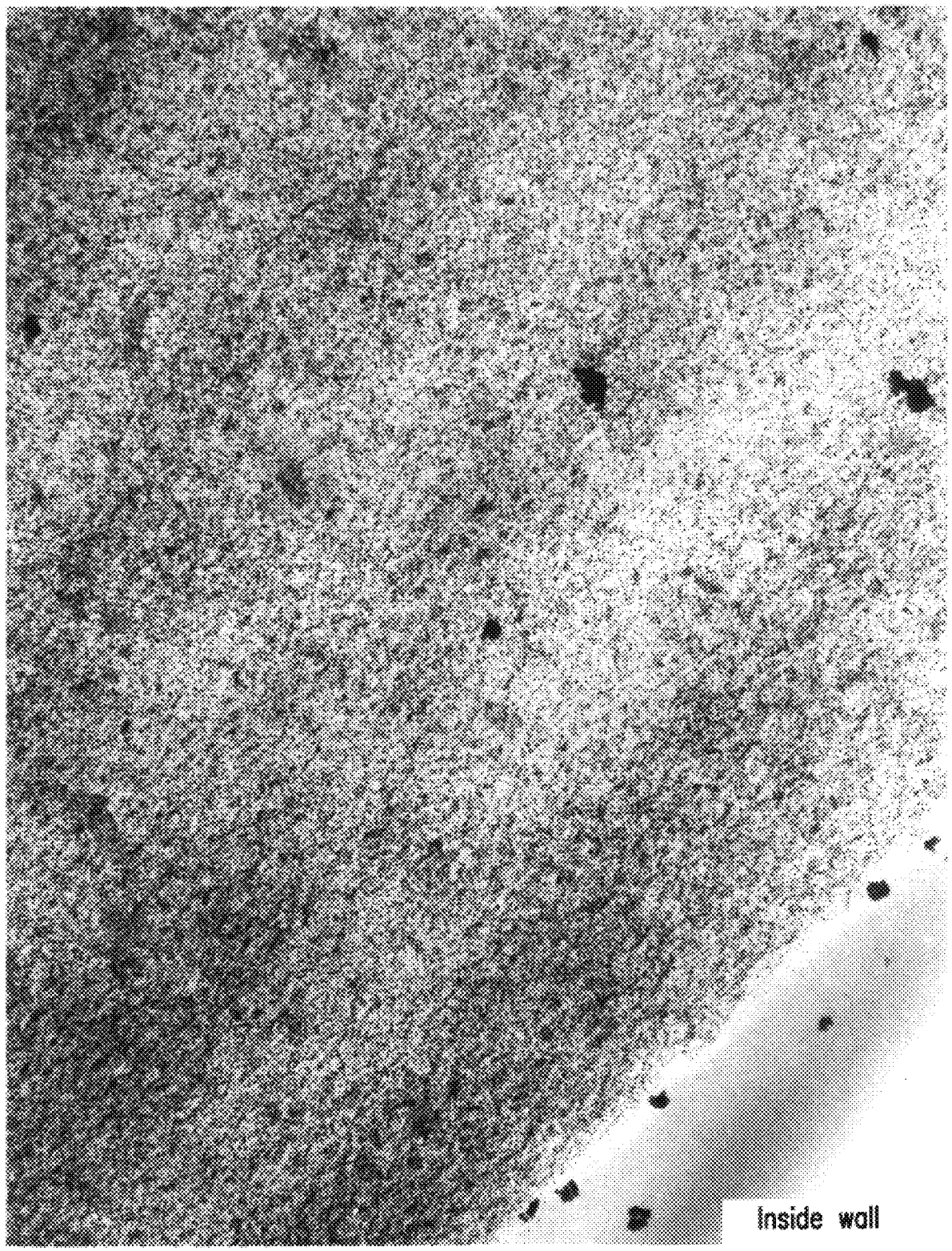

23.982 kg of NMMO, 1.350 kg of linters cellulose, 0.450 benzylcellulose with a DS of 0.18, 5.996 kg CS water and 0.018 kg of gallic acid propyl ester are kneaded at 80° C. for 30 minutes. The homogenous mixture is first deep-frozen then ground and loaded into a supply container connected to a double-screw extruder with two degassing zones and screws turning in the opposite direction. The pulverized mixture is fed continuously through a metering double screw to the extruder, heated to 100° C. The melt is degassed in the degassing zones at a pressure of 100 mbar, with air and a total of 1.796 kg of water being removed. The resultant spinning solution is filtered and supplied by a metering pump to a hollow fiber spinneret heated to 120° C., the spinneret being located at a distance of 110 mm above the surface of the regenerating bath. The outside diameter of the spinneret hole is 1140 microns, and that of the core needle is 830 microns. Isopropyl myristate is used as the hollow-forming fluid. CS water at 40° C. is used as the regenerating bath. The takeoff speed is 200 m/min and the draft 9.43. The hollow fibers are first washed with CS water then treated with a solution of 15 wt. % glycerin, 35 wt. % isopropanol, and 50 wt. % water and dried at 50° C. The hollow fiber obtained using this method has a porous structure with a maximal pore size of 15 to 20 nm and a somewhat thicker though yet open outer and inner surface (see FIGS. 18, 21, and 22) and exhibits the following properties:
inside diameter (microns): 200
wall thickness (microns): 13
UFR water (ml/h m²mm Hg): 61
screening coefficient, cytochrome C: 0.70
screening coefficient, albumin: 0.06

The capillary membranes are prepared into test bodies (dialyzers) with a surface area of 1.2 m² and their biocompatibility properties are tested. The following results are obtained:

| | | |
|---|---|---|
| $C_{5a}$ activation (ng/ml): | 27 | (N = 9) |
| TAT (ng/ml): | 18 | (N = 9) |
| PC (%): | 80 | (N = 9) |
| Heparin (U/ml): | 3.9 | (N = 9) |

-continued

Cuprophan (comparison)

| $C_{5a}$ activation (ng/ml): | 601 | (N = 9) |
| TAT (ng/ml): | 17 | (N = 9) |
| PC (%): | 77 | (N = 9) |
| Heparin (U/ml): | 4.0 | (N = 9) |

It is clear from these results that the modified membranes demonstrate very good biocompatibility.

EXAMPLE 5

23.982 kg of NMMO, 1.350 kg of linters cellulose, 0.450 cellulose dodecenylsuccinate with a DS of 0.37, 5.996 kg CS water and 0.018 kg of gallic acid propyl ester are kneaded at 80° C. for 30 minutes. The homogenous mixture is first deep-frozen then ground and loaded into a supply container connected to a double-screw extruder with two degassing zones and screws turning in the opposite direction. The pulverized mixture is fed continuously through a metering double screw to the extruder, heated to 100° C. The melt is degassed in the degassing zones at a pressure of 100 mbar, with air and a total of 1.796 kg of water being removed. The resultant spinning solution is filtered and supplied by a metering pump to a hollow fiber spinneret heated to 120° C., said spinneret being located at a distance of 110 mm above the surface of the regenerating bath. The outside diameter of the spinneret hole is 1140 microns, and that of the core needle is 830 microns. Isopropyl myristate is used as the hollow-forming fluid. CS water at 40° C. is used as the regenerating bath. The takeoff speed is 200 m/min and the draft 9.43. The hollow fibers are first washed with CS water then treated with a solution of 15 wt. % glycerin, 35 wt. % isopropanol, and 50 wt. % water and dried at 50° C. The hollow fibers obtained using this method have a still clearly recognizable porosity with a maximal pore size of 10 to 15 nm (see FIG. 18) and exhibits the following properties:

inside diameter (microns): 200
wall thickness (microns): 13
UFR water (ml/h m²mm Hg): 37
screening coefficient, cytochrome C: 0.57
screening coefficient, albumin: 0.004

The capillary membranes are prepared into test bodies (dialyzers) with a surface area of 1.2 m² and their biocompatibility properties are tested. The following results are obtained:

| $C_{5a}$ activation (ng/ml): | <10 | (N = 9) |
| TAT (ng/ml): | 14 | (N = 9) |
| PC (%): | 91 | (N = 9) |
| Heparin (U/ml): | 4.8 | (N = 9) |
| Cuprophan (comparison) | | |
| $C_{5a}$ activation (ng/ml): | 601 | (N = 9) |
| TAT (ng/ml): | 17 | (N = 9) |
| PC (%): | 77 | (N = 9) |
| Heparin (U/ml): | 4.0 | (N = 9) |

It is clear from these results that the modified membranes demonstrate very good biocompatibility.

EXAMPLE 6

23.280 kg of NMMO, 2.550 kg of linters cellulose, 0.450 copolymer polymethacryl acid butyl methacrylate, 5.830 kg CS water and 0.018 kg of gallic acid propyl ester are kneaded at 80° C. for 30 minutes. The homogenous mixture is first deep-frozen then ground and loaded into a supply container connected to a double-screw extruder with two degassing zones and screws turning in the opposite direction. The pulverized mixture is fed continuously through a metering double screw to the extruder, heated to 100° C. The melt is degassed in the degassing zones at a pressure of 100 mbar, with air and a total of 2.280 kg of water being removed. The resultant spinning solution is filtered and supplied by a metering pump to a hollow fiber spinneret heated to 120° C., the spinneret being located at a distance of 110 mm above the surface of the regenerating bath. The outside diameter of the spinneret hole is 1140 microns, and that of the core needle is 830 microns. Isopropyl myristate is used as the hollow-forming fluid. CS water at 40° C. is used as the regenerating bath. The takeoff speed is 120 m/min and the draft 5.2. The hollow fibers are first washed with CS water then treated with a solution of 15 wt. % glycerin, 35 wt. % isopropanol, and 50 wt. % water and dried at 50° C. The hollow fiber obtained using this method has a porous structure with a maximal pore size of <5 nm (see FIG. 18) and exhibits the following properties:

inside diameter (microns): 225
wall thickness (microns): 25
UFR water (ml/h m²mm Hg): 17
screening coefficient, cytochrome C: 0.17
screening coefficient, albumin: 0.005

The capillary membranes are prepared into test bodies (dialyzers) with a surface area of 1.2 m² and their biocompatibility properties are tested. The following results are obtained:

| $C_{5a}$ activation (ng/ml): | 72 | (N = 9) |
| TAT (ng/ml): | 45 | (N = 9) |
| PC (%): | 69 | (N = 9) |
| Heparin (U/ml): | 3.7 | (N = 9) |
| Cuprophan (comparison) | | |
| $C_{5a}$ activation (ng/ml): | 601 | (N = 9) |
| TAT (ng/ml): | 17 | (N = 9) |
| PC (%): | 77 | (N = 9) |
| Heparin (U/ml): | 4.0 | (N = 9) |

It is clear from these results that the modified membranes demonstrate very good biocompatibility.

EXAMPLES 7–8

Using the method described in Example 1, capillary membranes are spun from a cellulose spinning solution, treated with a finish with a different composition and their dialysis output tested. The results are given in Table 1.

TABLE 1

| Example | Finishing Composition (wt. %) | UFR$_{water}$ ml/h m²mm Hg | Screening Coef.$_{CC}$ | Screening Coef.$_{albumin}$ |
| --- | --- | --- | --- | --- |
| 7 | Gycerin:IPA:water = 40:10:50 | 101 | 0.91 | 0.09 |
| 8 | PEG 4000:IPA:water = 20:30:50 | 73 | 0.83 | 0.07 |

EXAMPLE 9

From the spinning solution of Example 1, a hollow fiber is spun using the same method, regenerated with water at 85° C., then washed with water, finished with a mixture of glycerin (30 wt. %), isopropanol (20 wt. %), and water (50 wt. %) and dried at 50° C. The hollow fiber has the following dialysis properties:
UFR water (ml/h m²mm Hg): 160
screening coefficient, cytochrome C: 0.95
screening coefficient, albumin: 0.22

EXAMPLE 10

Based on Example 1, an NMMO spinning solution with 8% methylcellulose content of DS=0.24 is produced and spun into hollow fibers. The distance from the spinning jet to the surface of the regenerating bath is 130 mm. The regenerating medium is 40° C. water. After washing with water, the hollow fiber is treated with a mixture of 20 wt. % glycerin, 30 wt. % isopropanol, and 50 wt. % water and dried at 50° C. The inside diameter of the hollow fiber is 210 microns and the wall thickness, 17 microns. The hollow fiber is prepared into test bodies about which the following data are reported:
UFR water (ml/h m²mm Hg): 90
screening coefficient, cytochrome C: 0.82
screening coefficient, albumin: 0.08

In contrast to the unmodified cellulose membrane, $C_{5a}$ activation is more than 98% reduced. The thrombogenicity and the heparin absorption are in the same order of magnitude as with cuprophan.

EXAMPLE 11

In the same manner described in Example 1, from an NMMO spinning solution with 6% polymer content which consists of 75 wt. % linters cellulose and 25 wt. % benzylcellulose of DS=0.24, capillary membranes with an inside diameter of 194 microns and a wall thickness of 19 microns are obtained. The test bodies produced from these hollow fibers have the following dialysis properties:
UFR water (ml/h m²mm Hg): 94
screening coefficient, cytochrome C: 0.80
screening coefficient, albumin: 0.09

In contrast to the unmodified cellulose membrane, $C_{5a}$ activation is reduced by 97%. The thrombogenesis and the heparin absorption are in the same order of magnitude as with cuprophan.

EXAMPLE 12

11.991 kg of NMMO, 0.900 kg benzylcellulose with a DS of 0.19, 2.998 kg CS water, and 0.010 kg of gallic acid propyl ester are mixed well in a kneader connected to the extruder. The mixture is fed continuously through a metering double screw to the extruder, heated to 100° C. The melt is degassed in the degassing zones at a pressure of 100 mbar, with air and a total of 0.898 kg of water being removed. The resultant spinning solution is filtered and supplied by a metering pump to a hollow fiber spinneret heated to 120° C., said spinneret being located at a distance of 5 mm above the surface of the regenerating bath. Water at a temperature of 60° C. is used as the regenerating bath. Isopropyl myristate is used as the hollow-forming fluid. The takeoff speed is 250 m/min. The hollow fibers are first washed with CS water then treated with a solution of 15 wt. % glycerin, 35 wt. % isopropanol, and 50 wt. % water and dried at 50° C. The hollow fibers obtained in this manner exhibit the following properties:
inside diameter (microns): 200 microns
wall thickness (microns): 10 microns
UFR water (ml/h m²mm Hg): 98
screening coefficient, cytochrome C: 0.82
screening coefficient , albumin: 0.08

In contrast to the unmodified cellulose membrane, $C_{5a}$ activation is reduced by 93% reduced. The thrombogenicity and the heparin absorption are in the same order of magnitude as with cuprophan.

EXAMPLE 13

In a heatable 600 ml duplex kneader with a distillation cap, 23.4 g benzylcellulose (DS=0.24) with 3.9% moisture content, 226.7 g NMMO with 14% water content, 16.1 g CS water and 0.225 g gallic acid propyl ester are kneaded for 20 minutes at 80° C. Then 16.3 g of water is distilled off at 120 mbar and 100° C. within 30 minutes. The solution is processed using a film drawing device to form flat membranes. Water at 20° C. served as the regenerating bath. The membranes are washed thoroughly with water, treated with a solution of 10 wt. % glycerin, 40 wt. % ethanol, and 50 wt. % water, stretched on a frame, and dried at 22° C. The flat membrane thus produced is 22 microns thick and had the following properties:
UFR water (ml/h m²mm Hg): 55
screening coefficient, cytochrome C: 0.76
screening coefficient, albumin: 0.04

In comparison to unmodified membranes, the $C_{5a}$ activation is reduced more than 95%. The thrombogenesis and the heparin absorption are of the same order of magnitude as with cuprophan.

EXAMPLES 14–24

Similarly to Example 13, spinning solutions containing 10% polymer content are produced from benzylcellulose, cellulose dodecenylsuccinate, cellulose butyl carbamate, cellulose 2-hydroxytetradecyl ether, cellulose 3-trimethoxysilyl-2-hydroxypropyl ether as well as mixtures of cellulose with benzylcellulose, olive oil, eicosyl/docosylamine, stearic acid, and polymethacryl acid butyl methacrylate, processed into flat membranes, and tested for their biocompatibility properties.

The results are summarized in Table 2.

TABLE 2

| Example | Membrane | $c_{5a}$ Reduction based on unmod. Cellulose membrane (%) |
|---|---|---|
| 14 | benzylcellulose (DS = 0.07) | 88.5 |
| 15 | benzylcellulose (DS = 0.09)/cellulose (5:95) | 74.5 |
| 16 | benzylcellulose (DS = 0.09)/cellulose (20:80) | 89.0 |
| 17 | cellulose dodecenylsuccinate (DS = 0.10) | 97.0 |
| 18 | cellulose butyl carbamate (DS = 0.70) | 94.0 |
| 19 | cellulose 2-hydroxy-tetradecyl ether (0.06) | 79.0 |
| 20 | cellulose 3-trimethoxysilyl-2-hydroxypropyl ether (0.05) | 68.0 |
| 21 | cellulose/olive oil (85:15) | 86.6 |
| 22 | cellulose eicosyl-docosylamine (80:20) | 77.3 |
| 23 | cellulose/stearic acid (85:15) | 70.8 |
| 24 | celulose/polymethacrylic acid butyl methacrylate (85:15) | 94.6 |

The thrombogenesis and heparin absorption are of the same order of magnitude as with cuprophan.

EXAMPLE 25

In a heatable 600 ml duplex kneader with a distillation cap, 16.86 g (0.1 mol) linters cellulose with 3.9% moisture content, 7.5 g (0.05 mol) 1,2-epoxy-2-phenoxypropane, 1 g sodium hydroxide, 0.15 g gallic acid propyl ester, 19.3 g CS water, and 280.9 g NMMO with a 14.5% water content are stirred for 3 hours at 85° C. Then 16.5 g of water is distilled off at a 120 mbar at 100° C. within 45 minutes. The solution is processed using a film drawing device to form flat membranes. Water at 40° C. served as the regenerating bath. The membranes are washed thoroughly with water, ethanol, and water, treated with a solution of 40 wt. % glycerin, 10 wt. % isopropanol, and 50 wt. % water, stretched on a frame, and dried at 22° C. The flat membrane thus produced has a DS of 0.11, is 15 microns thick, and exhibits a $C_{5a}$ activation that is reduced 81% by comparison with unmodified membranes. The thrombogenesis and heparin absorption are of the same order of magnitude as with cuprophan.

EXAMPLES 26–37

Similarly to Example 13, flat membranes are produced from cellulose-NMMO solutions with 14% cellulose content. Water, an organic solvent, or a mixture thereof served as regenerating media. The membranes are washed with CS water and treated with a mixture of glycerin, ethanol, and water of different composition. The following $UFR_{water}$ values are measured (Table 3).

TABLE 3

| Example | Membrane Thickness (microns) | Regenerating Bath | Finishing Bath Glycerin/ Ethanol/ Water (wt. %) | $UFR_{water}$ (ml/h m²mm Hg) |
|---|---|---|---|---|
| 26 | 14 | water | 5:45:50 | 25 |
| 27 | 16 | water | 25:25:50 | 118 |
| 28 | 19 | water | 30:20:50 | 149 |
| 29 | 18 | water | 40:10:50 | 154 |
| 30 | 16 | ethanol | 5:45:50 | 21 |
| 31 | 23 | ethanol/water = 20:80 | 20:30:50 | 141 |
| 32 | 42 | propanol | 5:45:50 | 28 |
| 33 | 13 | propanol/water = 80:20 | 5:45:50 | 22 |
| 34 | 12 | acetone/water = 80:20 | 5:45:50 | 15 |
| 35 | 15 | dimethylsulfoxide | 5:45:50 | 46 |
| 36 | 12 | dimethylsulfoxide/water = 60:40 | 5:45:50 | 39 |
| 37 | 20 | dimethylsulfoxide/water = 20:80 | 20:30:50 | 127 |

EXAMPLES 38–44

Similarly to Example 13, NMMO solutions with a 12% cellulose content are prepared with the addition of a water-soluble additive and processed into flat membranes. Water at 20° C. served as the regenerating bath. The membranes are washed with CS water and treated with a mixture of glycerin, ethanol, and water (5:45:50 wt.%) before drying. The following $UFR_{water}$ values are measured (Table 4).

TABLE 4

| Example | Additive 20% based on Cellulose | Membrane Thickness (microns) | $UFR_{water}$ (ml/h m²mm Hg) |
|---|---|---|---|
| 38 | ethylene glycol | 18 | 55 |
| 39 | glycerin | 17 | 40 |
| 40 | PEG 200 | 18 | 44 |
| 41 | PEG 600 | 16 | 46 |
| 42 | PEG 1000 | 16 | 48 |

TABLE 4-continued

| Example | Additive 20% based on Cellulose | Membrane Thickness (microns) | $UFR_{water}$ (ml/h m²mm Hg) |
|---|---|---|---|
| 43 | PEG 4000 | 16 | 53 |
| 44 | D(−)sorbite | 14 | 54 |

EXAMPLES 45–48

Similarly to Example 13, NMMO solutions are prepared from a mixture of cellulose with benzylcellulose (DS=0.18), diethylaminoethylcellulose (DS=0.40), polyacrylonitrile, and polymethacrylic acid butyl methacrylate with a 10% polymer content and processed into flat membranes. Water at 20° C. served as the regenerating bath. The membranes are washed with CS water and treated with a glycerin/ethanol/water mixture (5:45:50 wt. %) before drying. The following $UFR_{water}$ values are measured (Table 5).

TABLE 5

| Example | Membrane | Membrane Thickness (microns) | $UFR_{water}$ (ml/h m²mm Hg) |
|---|---|---|---|
| 45 | cellulose/benzylcellulose (70:30) | 14 | 34 |
| 46 | cellulose/diethylaminoethyl-cellulose (95:5) | 15 | 46 |
| 47 | cellulose/polyacrylonitrile (90:10) | 11 | 85 |
| 48 | cellulose/polymethacrylic acid-butyl methacrylate (90:10) | 10 | 42 |

EXAMPLE 49

Similarly to Example 13, an NMMO spinning solution is prepared from a mixture of cellulose and carboxyethylcellulose with DS=0.10 (90:10 wt. %) with an 8% polymer content and processed into flat membranes. Water at 60° C. served as the regenerating bath. The membranes are washed with CS water and treated with a mixture of glycerin, ethanol, and water (20:30:50 wt. %) before drying. The membrane thickness is 18 microns and the $UFR_{water}$ value is 357 ml/h m²mm Hg.

EXAMPLE 50

The membranes of Example 49 are treated for 1 hour at 20° C. before drying with a glycerin/ethanol/water mixture (20:30:50 wt. %) containing 5 wt. % glycide ether, processed for 1 hour at 20° C., stretched on a frame, predried initially at 22° C. and then cured at 60° C. for 24 hours. The membrane thickness is 19 microns and the $UFR_{water}$ value is 500–600 ml/h m²mm Hg.

EXAMPLES 51–55

Similarly to Example 1, a spinning solution of linters cellulose and an additive, each 20% based on cellulose, is prepared and processed into capillary membranes. The membranes produced in this manner exhibit the dialysis properties listed in Table 6.

TABLE 6

| Example | Additive (20 wt.) | UFR$_{water}$ ml/h m$^2$mm Hg | Screening Coef.$_{CC}$ | Screening Coef.$_{albumin}$ |
|---|---|---|---|---|
| 51 | sorbite | 84 | 0.83 | 0.08 |
| 52 | glycerin | 77 | 0.80 | 0.07 |
| 53 | polyvinylpyrrolidone | 77 | 0.80 | 0.09 |
| 54 | microcrystalline cellulose | 40 | 0.67 | 0.04 |
| 55 | PEG 1000 | 66 | 0.89 | 0.09 |

EXAMPLES 56–61

Similarly to Example 3, an NMMO spinning solution with a 6% polymer content consisting of 75 wt. % linters cellulose and 25 wt. % benzylcellulose with a DS of 0.24 is prepared and spun to form capillary membranes. Regenerating media of different compositions are used for coagulation (see Table 7). The distance between the spinneret and the surface of the regenerating bath is 100 mm. Isopropyl myristate served as the cavity-forming fluid. The capillary membranes are first washed with CS water then treated with a solution of 20 wt. % glycerin, 30 wt. % isopropanol, and 50 wt. % water and dried at 50° C. The membranes produced in this manner exhibit the dialysis properties listed in Table 7.

TABLE 7

| Example | Regeneration Medium | Regen. Bath Temp. (° C.) | Takeoff Speed (m/min) | UFR$_{water}$ ml/h m$^2$mm Hg | Screening Coef.$_{CC}$ | Screening Coef.$_{albumin}$ |
|---|---|---|---|---|---|---|
| 56 | water/NMMO 80/20 | 40 | 150 | 85 | 0.81 | 0.09 |
| 57 | water/NMMO 90/10 | 40 | 200 | 55 | 0.82 | 0.08 |
| 58 | ethanol | 22 | 200 | 67 | 0.70 | 0.01 |
| 59 | isopropanol | 22 | 100 | 120 | 0.92 | 0.20 |
| 60 | water/NMP 90/10 | 21 | 100 | 64 | 0.85 | 0.09 |
| 61 | water/DMSO 90/10 | 29 | 100 | 61 | 0.84 | 0.08 |

Figure 23:
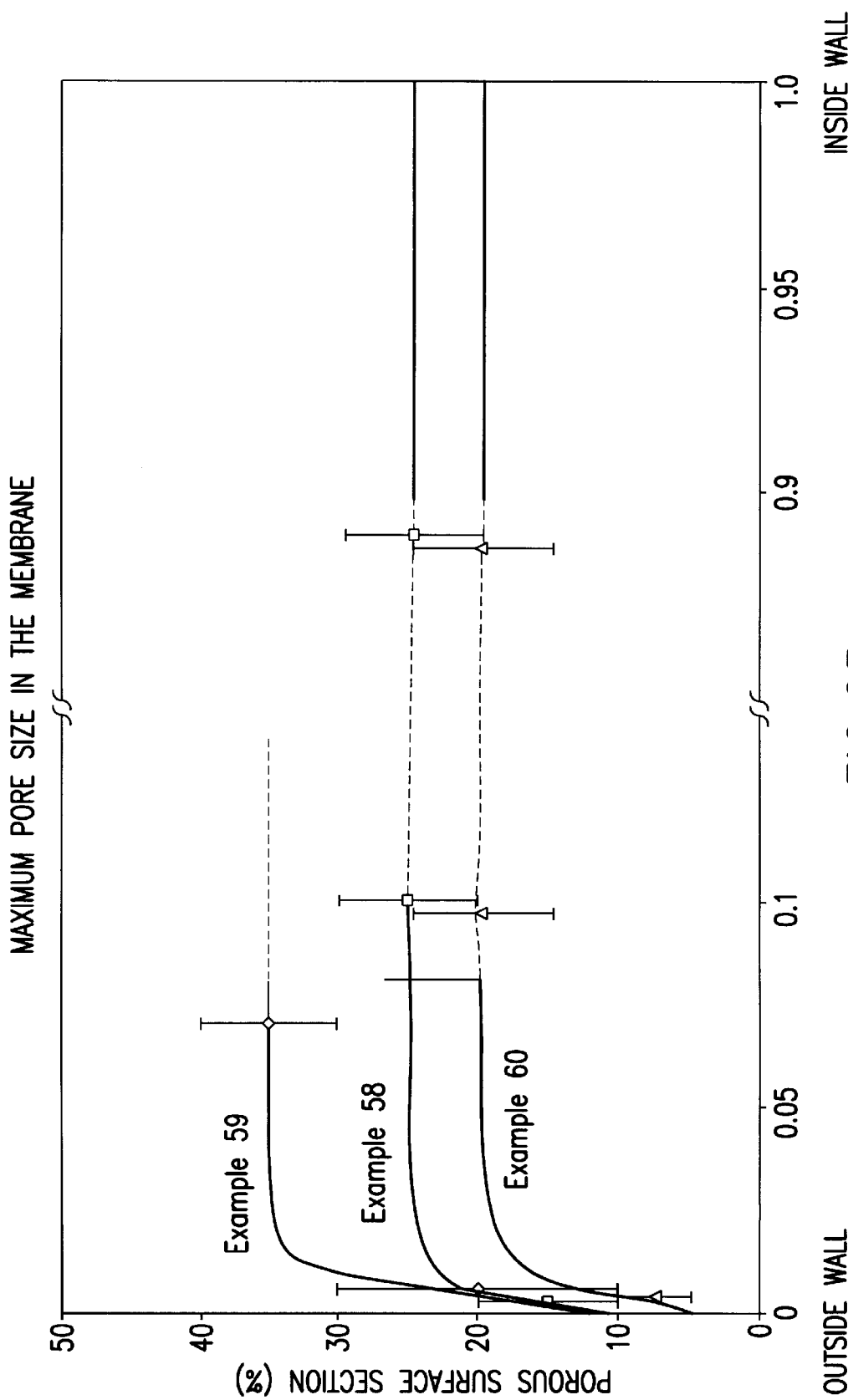
FIG. 23 is a graph of the porous structure of the membranes of Examples 58–60.
Figure 24:
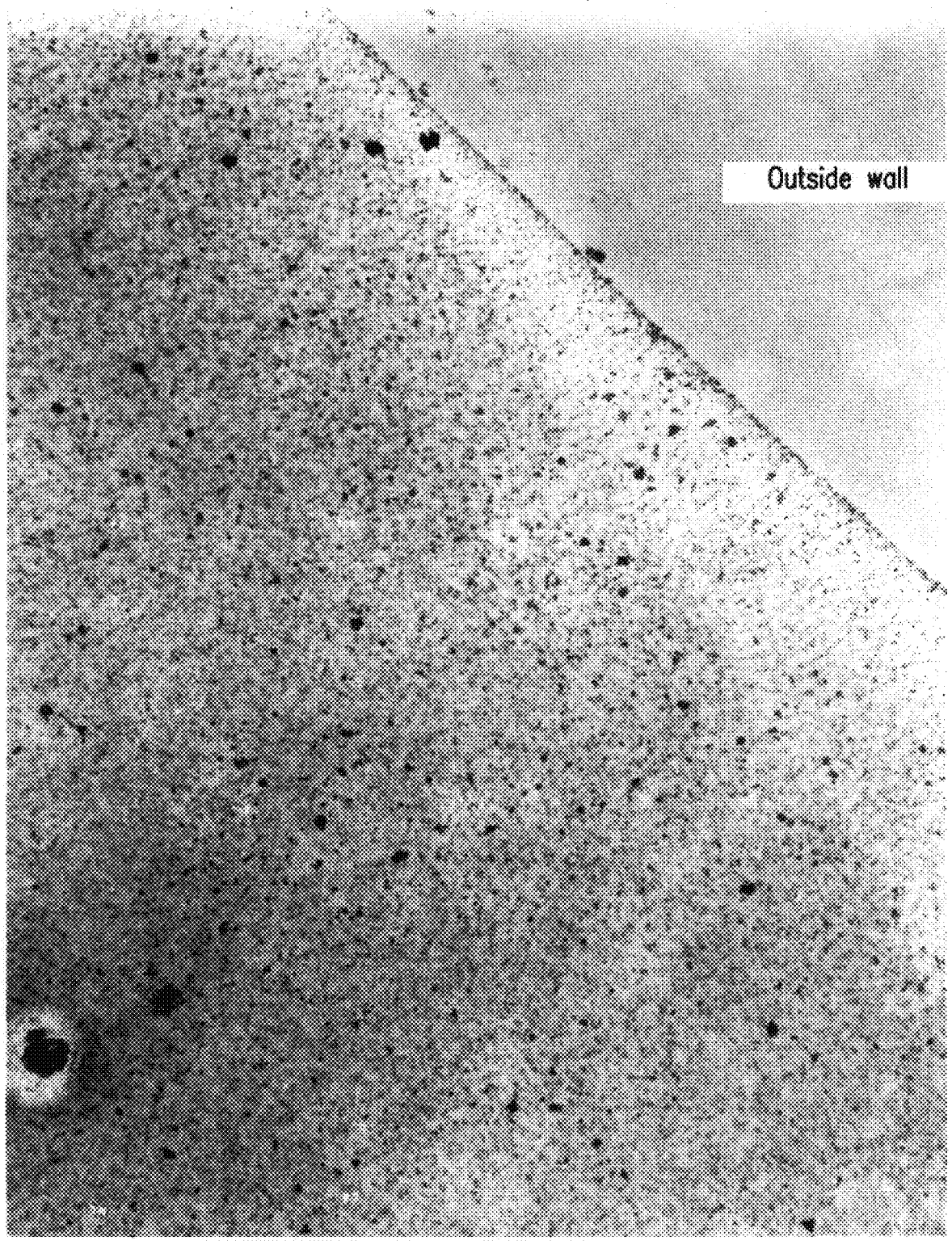
FIGS. 24 and 25 are microscopic photographs of the porous structure of the membrane of Example 58.
Figure 25:
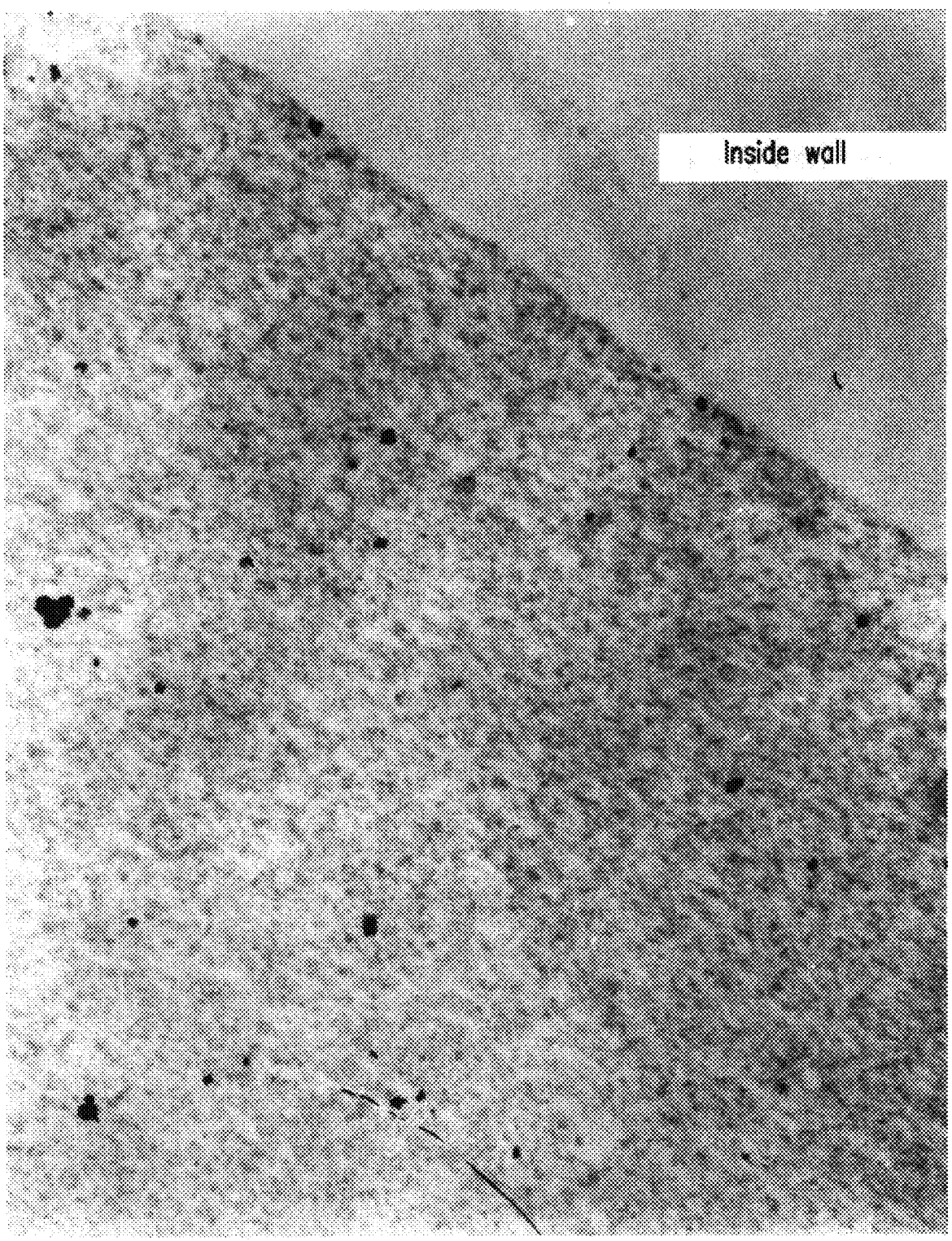

The microscopic examinations of the membranes of Examples 58, 59, and 60 show that these are porous with the maximum pore size in Example 59 being between 30 and 40 nm, that in Example 58 between 20 and 30 nm, and that in Example 60 being between 15 and 20 nm (see FIG. 23). Therefore the membrane structures are significantly influenced by the regenerating agents. As the hydrophily of the regenerating agent increases, a skin thickens or forms in the vicinity of the outer surface, as indicated in the case of the membrane in Example 58 (see FIG. 24). The inside wall is more open and has larger pores because of the lipophilic lumen filling (see FIG. 25).

EXAMPLES 62–70

Similarly to Example 3, an NMMO spinning solution with a 6% polymer content that consists of 75 wt. % linters cellulose and 25 wt. % benzylcellulose with a DS of 0.24, is prepared and spun to form capillary membranes. Fluids with different compositions are used for cavity formation (lumen filling). The distance between the spinneret and the regenerating bath surface with the exception of Example 65 (20 mm), 68 (5 mm), and 69 (5 mm) is 100 mm. CS water between 24 and 60° C. is used as the regenerating bath. The takeoff speed is 100 to 200 m/min. The capillary membranes are first washed with CS water then treated with a solution of 20 wt. % glycerin, 30 wt. % isopropanol, and 50 wt. % water (with the exception of Example 68; finishing composition: 10 wt. % glycerin, 40 wt. % isopropanol, and 50 wt. % water) and dried at 50° C. The membranes manufactured in this manner exhibit the dialysis properties listed in Table 8.

TABLE 8

| Example | Lumen Filling | Regen. Bath Temp. (° C.) | Takeoff Speed (m/min) | UFR$_{water}$ ml/h m$^2$mm Hg | Screening Coef.$_{CC}$ | Screening Coef.$_{albumin}$ |
|---|---|---|---|---|---|---|
| 62 | water/NMMO 40/60 | 24 | 200 | 38 | 0.82 | 0.007 |
| 63 | water/NMMO 40/60 | 40 | 200 | 49 | 0.90 | 0.08 |
| 64 | water/NMMO 40/60 | 60 | 200 | 59 | 0.97 | 0.23 |
| 65 | water/NMMO 50/50 | 40 | 100 | 53 | 0.85 | 0.20 |
| 66 | water/NMP 20/80 | 40 | 200 | 44 | 0.92 | 0.05 |
| 67 | water/glycerin 20/80 + 5% NaCL | 40 | 200 | 46 | 0.65 | 0.06 |
| 68 | PEG 400 | 40 | 200 | 28 | 0.55 | 0.02 |
| 69 | PEG 400 | 40 | 200 | 51 | 0.73 | 0.09 |
| 70 | water/DMSO 20/80 | 40 | 200 | 57 | 0.82 | 0.08 |

Figure 26:
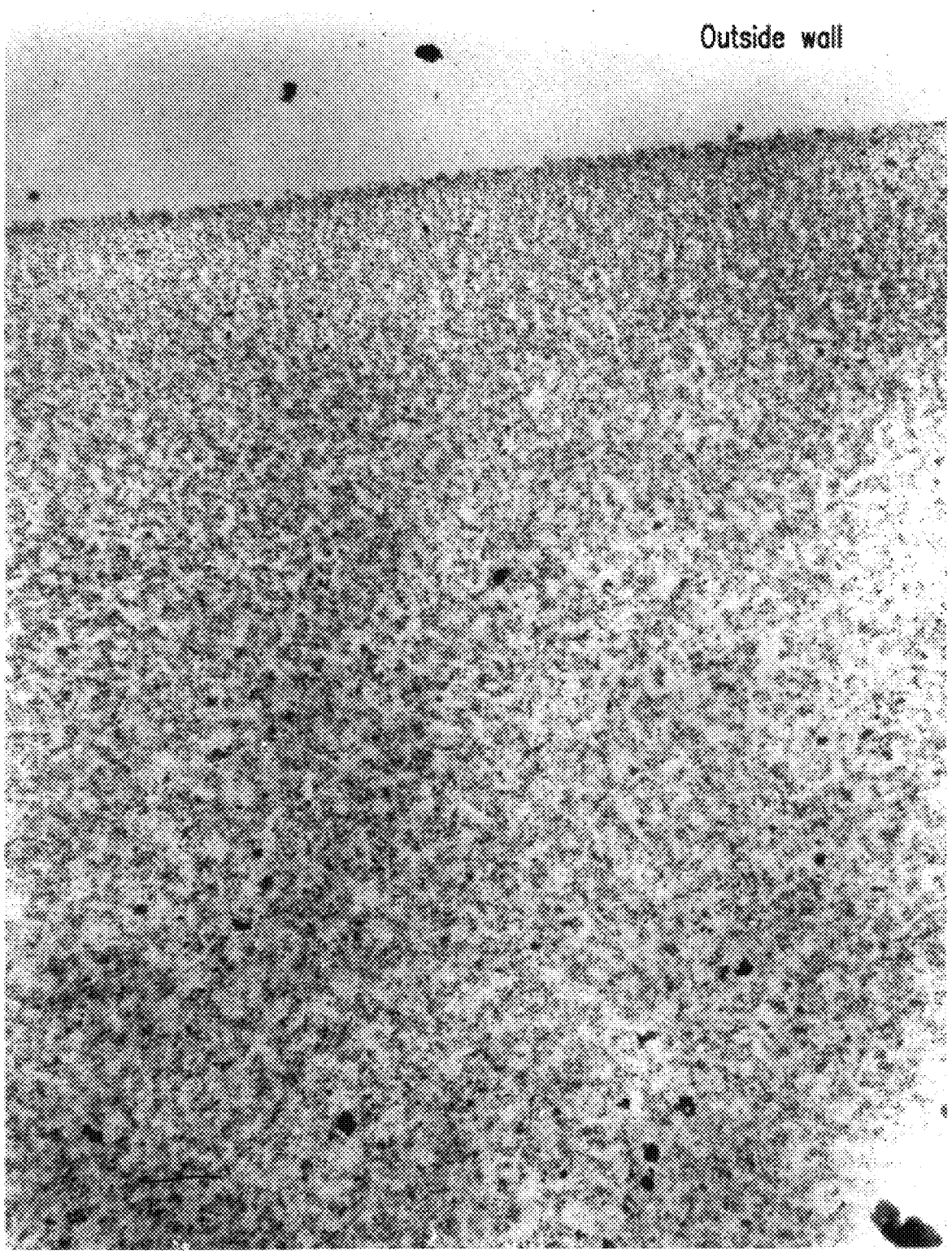
FIGS. 26 and 27 are microscopic photographs showing the porous structure of the membrane of Example 67.
Figure 27:
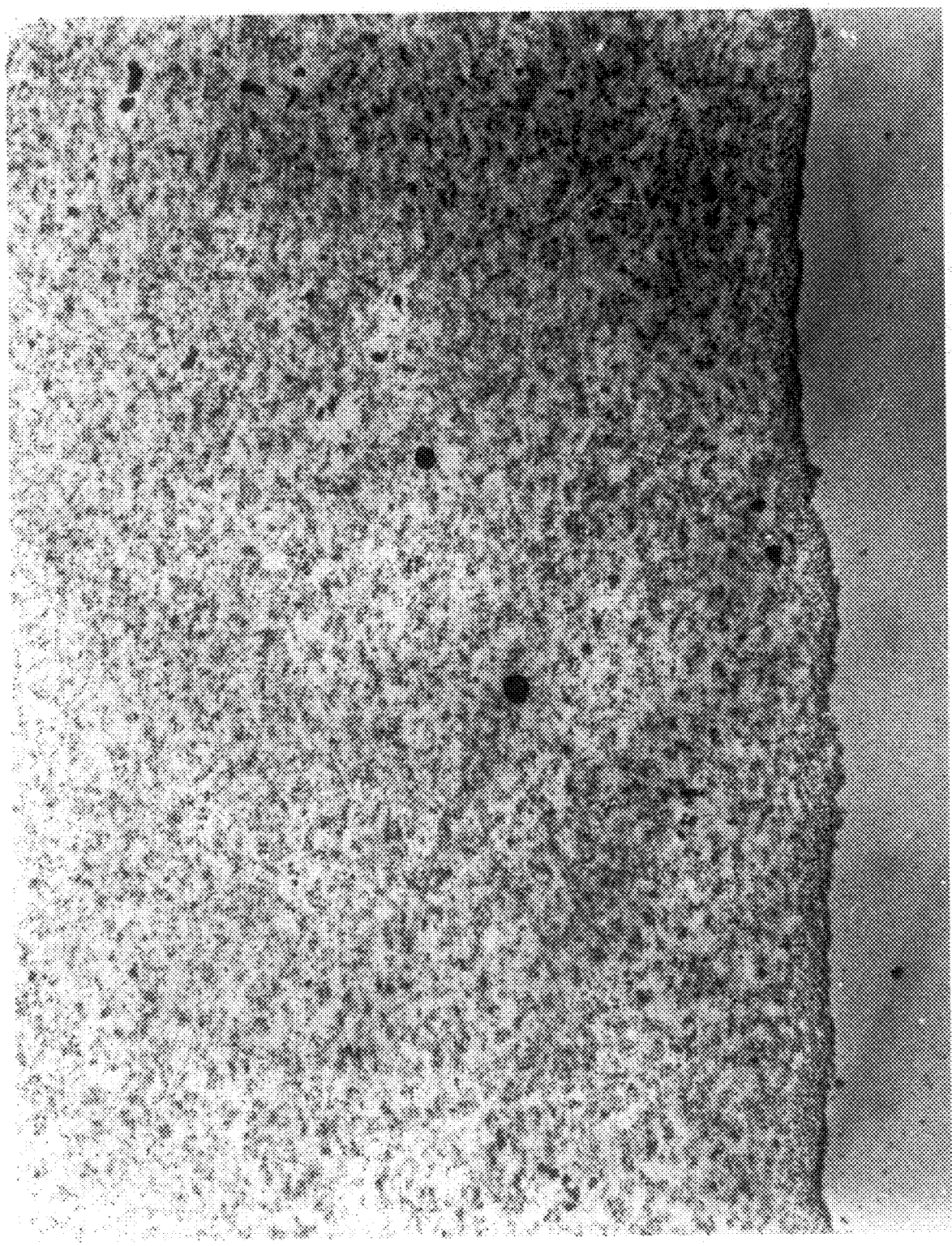
Figure 28:
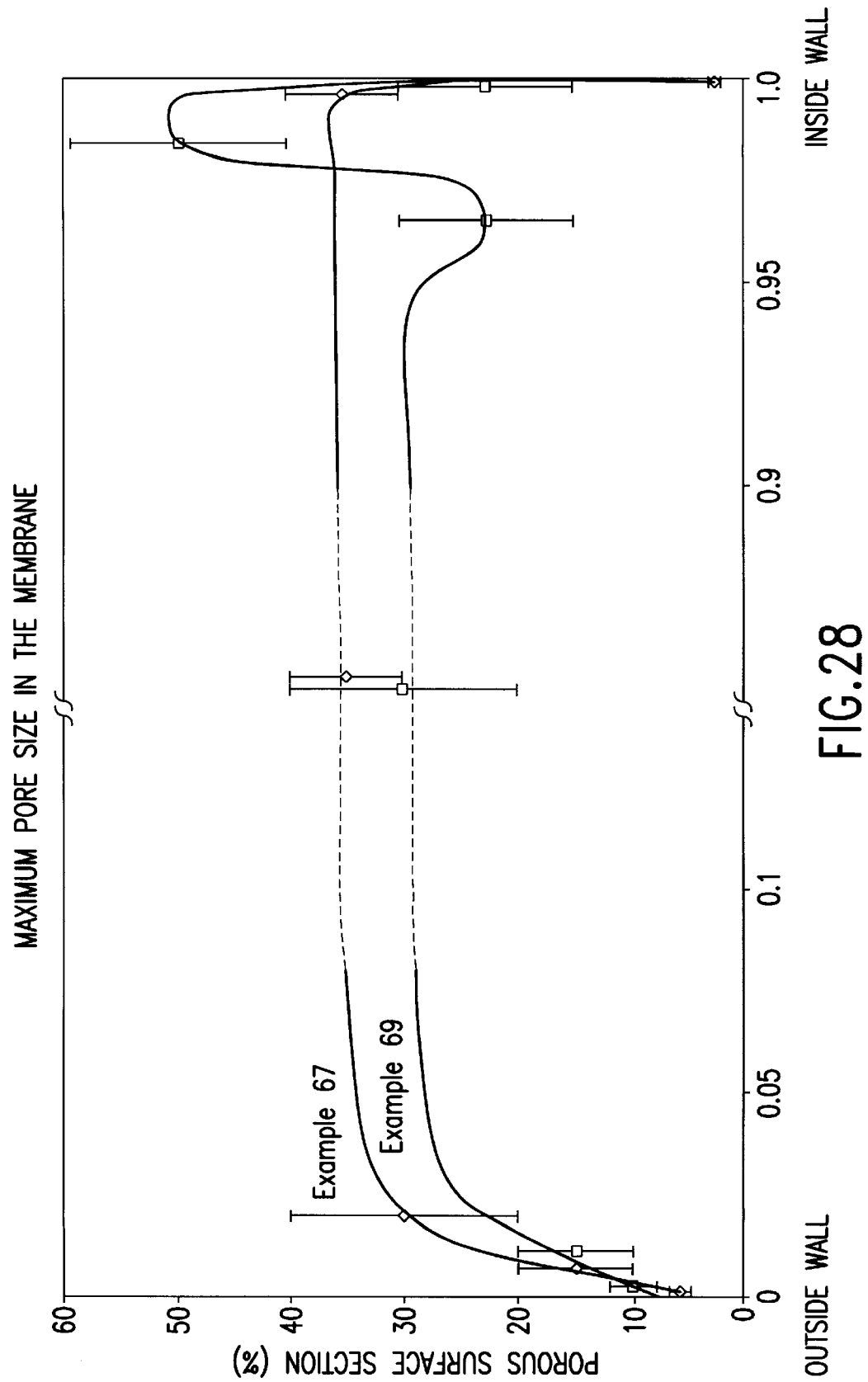
FIG. 28 is a graph of the porous structure of the membranes of Examples 67 and 69.
Figure 29:
FIGS. 29 and 30 are microscopic photographs showing the porous structure of the membrane of Example 69.
Figure 30:
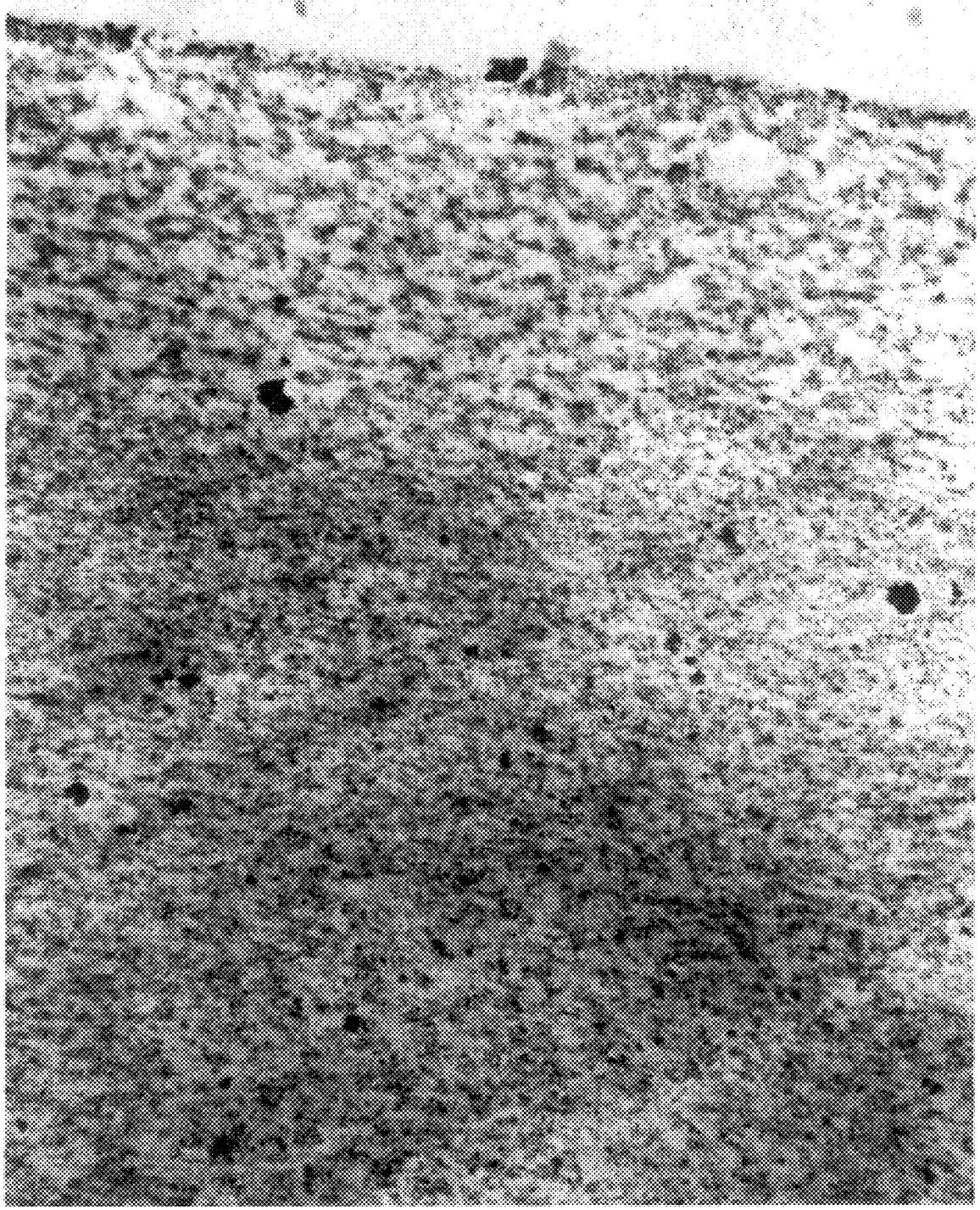

According to the microscopic examinations, the membranes of Examples 67 and 69 are porous. In those membranes that are spun with an internal filling of glycerin/water/NaCl (Example 67), there is a thickening in the vicinity of the outer surface and formation of a skin in the vicinity of the inner surface (see FIGS. 26, 27). The maximum pore size is 30 to 40 nm (see FIG. 28). The membranes spun with PEG 400 (Example 69) have a thickening on the outside wall and a slight thickening on the inside wall in contrast to the immediately adjacent coarse-pored structure (see FIGS. 29, 30). The maximum pore size is between 25 and 55 nm (see FIG. 28).

EXAMPLES 71–74

Using the same procedure as in Example 3, capillary membranes are spun from an NMMO spinning solution with a 6% polymer content consisting of 75 wt. % linters cellulose and 25 wt. % benzylcellulose with a DS of 0.24. CS water at 77° C. is used as the regenerating bath. The capillary membranes are treated with finishes of different compositions and their dialysis performance is tested. The results are listed in Table 9.

TABLE 9

| Example | Finishing Composition Glycerin:IPA:water (wt. %) | $UFR_{water}$ (ml/h m²mm Hg) | Screening Coef.$_{CC}$ |
|---|---|---|---|
| 71 | 0:50:50 | 10 | 0.37 |
| 72 | 5:45:50 | 55 | 0.81 |
| 73 | 10:40:50 | 90 | 0.91 |
| 74 | 20:30:50 | 158 | 0.96 |

The results of Table 9 show that the dialysis performance of the membranes depends to a great extent on the composition of the finishing. It increases very sharply with increasing glycerin content. Surprisingly, however, the membrane that is not treated with glycerin has a significantly higher dialysis performance than the treated membranes of DE-C2-3 021 943. This indicates a porous and stable membrane structure.

EXAMPLES 75–82

Using the same procedure as in Example 3, NMMO spinning solutions with different polymer contents are prepared and spun to form capillary membranes. The polymer consists of 75 wt. % linters cellulose and 25 wt. % benzylcellulose with a DS of 0.24. The distance between the spinneret and the regenerating bath surface is 110 mm. Isopropyl myristate served as the cavity-forming liquid. CS water at 26 to 80° C. is used as the regenerating bath. The takeoff speed is 200 m/min. The capillary membranes are first washed with CS water then treated with a solution of 20 wt. % glycerin, 30 wt. % isopropanol, and 50 wt. % water, and dried at 50° C. The membranes exhibit the dialysis properties listed in Table 10.

TABLE 10

| Example | Polymer Content of Spinning Sol'n (%) | Regen. Bath Temp. (° C.) | $UFR_{water}$ (ml/h m²mm Hg) | Screening Coef.$_{CC}$ | Screening Coef.$_{albumin}$ |
|---|---|---|---|---|---|
| 75 | 6 | 26 | 49 | 0.67 | 0.013 |
| 76 | 6 | 40 | 59 | 0.81 | 0.07 |
| 77 | 6 | 60 | 113 | 0.85 | 0.21 |
| 78 | 8 | 40 | 28 | 0.45 | 0.005 |
| 79 | 8 | 60 | 39 | 0.59 | 0.009 |
| 80 | 8 | 80 | 51 | 0.70 | 0.10 |
| 81 | 10 | 60 | 9 | 0.30 | 0.003 |
| 82 | 10 | 80 | 12 | 0.45 | 0.03 |

The results in Table 10 show a sharp increase in dialysis performance of those membranes with a declining polymer content in the spinning solution and a rising temperature of the regenerating bath.

Figure 31:
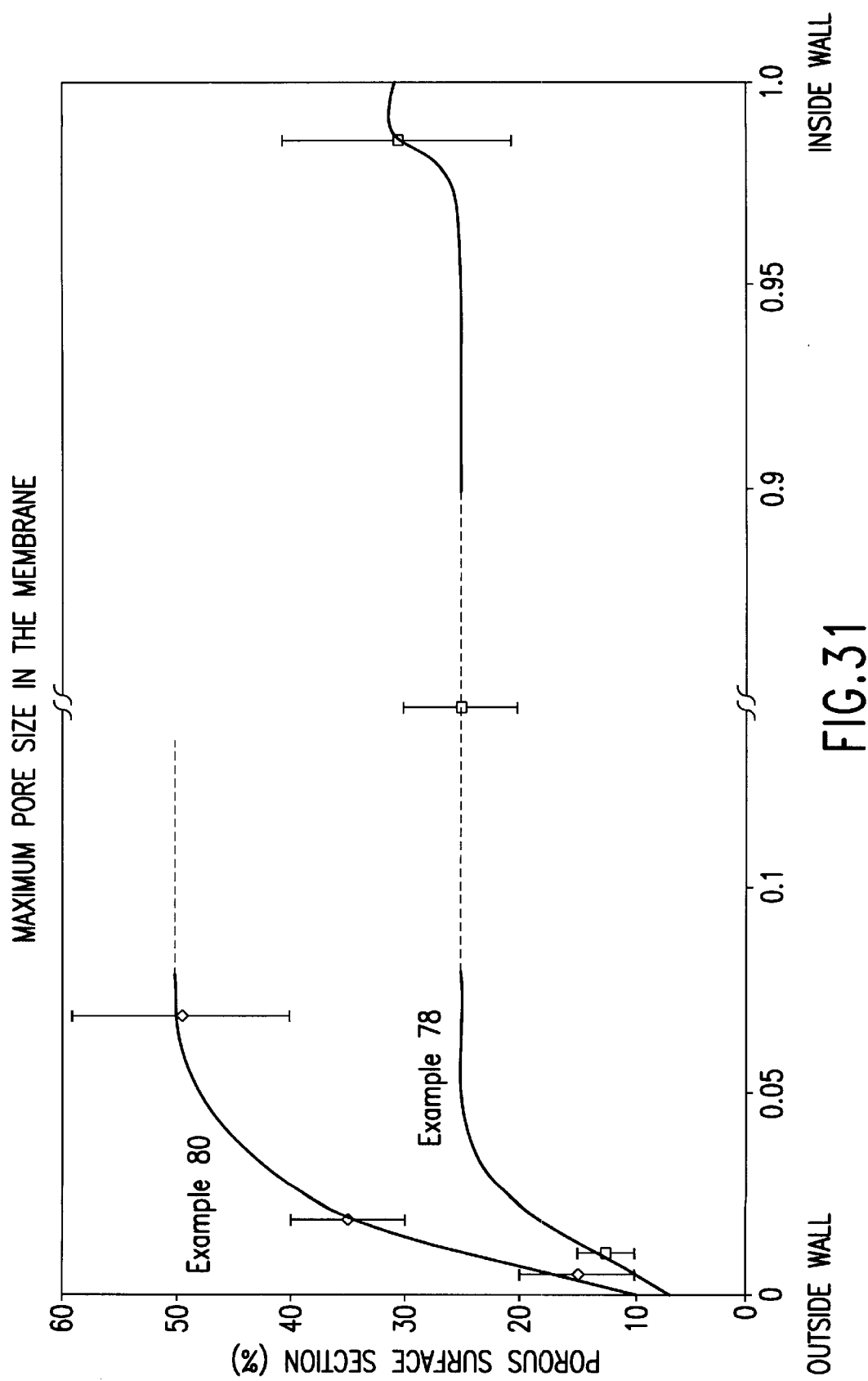
FIG. 31 is a graph of the porous structure of the membranes of Examples 78 and 80.

Microscopic studies of the membranes in Examples 78 and 80 also show that the membranes are porous and that the pore size increases significantly with the temperature of the regenerating bath (see FIG. 31). The maximum pore size of the membranes in Example 80 is between 45 and 50 nm and that in Example 78 between 20 and 30 nm.

EXAMPLES 83–88

Similarly to Example 3, an NMMO spinning solution with a 6% polymer content, consisting of 75 wt. % linters cellulose and 25 wt. % benzylcellulose, is prepared and spun to form capillary membranes. The takeoff speed is varied between 50 and 300 m/min. The distance between the spinneret and the regenerating bath surface is 70 mm. Isopropyl myristate served as the cavity-forming fluid. CS water at 40 to 80° C. is used as the regenerating bath. The membranes are first washed with CS water then treated with a solution of 20 wt. % glycerin, 30 wt. % isopropanol, and 50 wt. % water, and dried at 50° C. The membranes prepared in this fashion exhibit the dialysis properties listed in Table 11.

TABLE 11

| Example | Takeoff Speed m/min | Draft | Regen. Bath Temp. ° C. | $UFR_{water}$ ml/h m²mm Hg | Screening Coef.$_{CC}$ | $f_c$ | $X_c$ |
|---|---|---|---|---|---|---|---|
| 83 | 50 | 6.68 | 40 | 65 | 0.80 | 0.304 | 55 |
| 84 | 100 | 6.68 | 40 | 61 | 0.81 | 0.735 | 59 |
| 85 | 100 | 6.68 | 80 | 112 | 0.97 | 0.199 | 55 |
| 86 | 200 | 6.68 | 40 | 59 | 0.81 | 0.791 | 55 |
| 87 | 200 | 6.68 | 80 | 96 | 0.95 | 0.297 | 54 |
| 88 | 300 | — | 40 | 74 | 0.78 | | |

$X_c$=crystal components

As the results in Table 11 indicate, the crystallite orientation increases with the takeoff speed and decreases with increasing regenerating bath temperature. As the crystallite orientation ($f_c$) decreases, the dialysis performance of the membranes surprisingly increases sharply.

EXAMPLE 89

Using the same procedure as in Example 3, capillary membranes are spun from an NMMO spinning solution with 5% polymer content, consisting of 95 wt. % linters cellulose and 5 wt. % benzylcellulose with a DS of 0.31. CS water at 85° C. is used as the regenerating medium. The capillary membranes are first washed with CS water and then with acetone. The membranes moistened with acetone are processed with a 7% acetone toluene diisocyanate solution and heated in a drying cabinet under nitrogen and exclusion of atmospheric moisture for 3 hours at 40° C. Then the membranes are washed thoroughly with cold and warm ethanol, treated with a solution of 30 wt. % glycerin, 20 wt. % isopropanol, and 50 wt. % water, and dried at 50° C. The inside diameter of the membrane is 200 microns, the wall thickness is 16 microns, and the UFR$_{water}$ value is 350 ml/h m$^2$mm Hg.

EXAMPLE 90

Similarly to Example 3, an NMMO spinning solution with a 30% polymer content is prepared, consisting of 65 wt. % linters cellulose with a DP of 350 and 35 wt. % benzylcellulose with a DS of 0.20 and a DP of 270 and spun to form capillary membranes. The distance between the spinneret and the regenerating bath surface is 180 mm. CS water at 85° C. is used as the regenerating bath. The takeoff speed is 200 m/min. The capillary membranes are washed with CS water at 70° C., treated with a solution of 35 wt. % glycerin, 15 wt. % isopropanol, and 50 wt. % water and dried at 50° C. The inside diameter of the membrane is 230 microns, the wall thickness 35 microns, and the UFR$_{water}$ value 9 ml/h m$^2$mm Hg.

EXAMPLE 91

Similarly to Example 3, an NMMO spinning solution with 7% 3-butoxy-2-hydroxypropylcellulose with a DS 0.20 is prepared and spun to form capillary membranes. CS water at 60° C. is used as the regenerating bath. The distance between the spinneret and the surface of the regenerating bath is 160 mm. The takeoff speed is 100 m/min. Isopropyl myristate served as the internal filling. For washing, the capillary membranes are guided through several water baths at 80° C. connected in series, treated with a solution of 10 wt. % glycerin, 40 wt. % isopropanol, and 50 wt. % water, corrugated, dried, and processed with the aid of a flyer into bundles of 1.3 m$^2$ in area. The bundles are extracted with isopropanol, finished with a mixture of glycerin and isopropanol (10:90) and dried in a stream of nitrogen. The capillary membranes produced in this fashion, according to analytical tests, contained neither NMMO nor isopropyl myristate or any other extractable components except glycerin.

EXAMPLE 92

Similarly to Example 3, an NMMO spinning solution containing 14% benzylcellulose with DS=0.15 is prepared and spun to form capillary membranes. CS water at 70° C. is used as the regenerating bath. The distance between the spinneret and the surface of the regenerating bath is 185 mm and the spinning rate is 200 m/min. Isopropyl myristate served as the internal filling. The capillary membranes are prewashed in a countercurrent with CS water at 70° C., dried to a residual moisture content of 140%, corrugated, and processed into bundles of 1.3 m$^2$. The bundles are extracted with isopropanol, finished with a mixture of glycerin and isopropanol (25:75), and dried in a stream of nitrogen. Following extraction, neither NMMO is nor isopropyl myristate is analytically detectable in the bundles.

EXAMPLE 93

Similarly to Example 3, an NMMO spinning solution with a 9% polymer content consisting of 70 wt. % linters cellulose and 30 wt. % 3-phenoxy-2-hydroxypropylcellulose is prepared and spun to form capillary membranes. Ethanol at 25° C. is used as a regenerating bath. The distance between the spinneret and the surface of the regenerating bath is 140 mm and the takeoff speed is 200 m/min. A solution of 60 wt. % NMMO and 40 wt. % water is used as the cavity-forming fluid. The capillary membranes are guided through an ethanol bath at 25° C., wound onto a winding wheel, and then processed to form bundles of 1.3 m$^2$. The bundles are extracted with ethanol, finished with a mixture of glycerin and ethanol (15:85) and dried in a stream of nitrogen. No NMMO could be detected any longer in the bundles after extraction.

EXAMPLE 94

Similarly to Example 3, an NMMO spinning solution with a 6% benzylcellulose content of DS=0.28 is prepared and spun to form capillary membranes. CS water at 80° C. is used as the regenerating bath. The distance between the spinneret and the surface of the regenerating bath is 120 mm. The spinneret is located in a closed chamber in which a relative humidity of 87% and a temperature of 40° C. prevailed. Isopropyl myristate served as the internal filling. The takeoff speed is 200 m/min. The capillary membranes are washed in a countercurrent with CS water, dried to a residual moisture content of 100%, corrugated, and processed into bundles. The bundles are extracted with isopropanol, finished with a mixture of glycerin and isopropanol (5:95), and dried in a stream of nitrogen. The bundles no longer contained any NMMO or isopropyl myristate following extraction.

EXAMPLE 95

Using the same procedure as in Example 3, capillary membranes are spun from an NMMO spinning solution with a 6% polymer content that consists of 75 wt. % linters cellulose and 25 wt. % benzylcellulose with a DS of 0.28. CS water at 40° C. is used as the regenerating bath. The distance between the spinneret and the regenerating bath surface is 100 mm, the spinning speed is 200 m/min, and the draft, 9.43. Isopropyl myristate served as the lumen filling. The capillary membranes are washed with CS water then treated with a solution of 20 wt. % glycerin, 30 wt. % isopropanol, and 50 wt. % water and dried at 50° C. The membranes produced in this manner exhibit the following properties:
crystallite orientation: 0.78
crystal content (%): 60
ratio of crystallite length to crystallite width: 3.21
inside diameter (microns): 175
wall thickness (microns): 25
UFR-water (ml/h m$^2$mm Hg): 88.1
screening coefficient, cytochrome C: 0.85
screening coefficient, albumin: 0.10

EXAMPLE 96

Using the same procedure as in Example 95 but with the difference that the draft is 10.75, capillary membranes are produced and tested. They exhibit the following properties:
crystallite orientation: 0.83
crystal content (%): 60
ratio of crystallite length to crystallite width: 3.78
inside diameter (microns): 177
wall thickness (microns): 16
UFR-water (ml/h m$^2$mm Hg): 99
screening coefficient, cytochrome C: 0.83
screening coefficient, albumin: 0.10

EXAMPLE 97

Using the same procedure as in Example 95 but with the difference that the draft is 7.55, capillary membranes are produced and tested. They exhibit the following properties:

crystal content (%): 58
inside diameter (microns): 177
wall thickness (microns): 25
UFR-water (ml/h m$^2$mm Hg): 76
screening coefficient, cytochrome C: 0.84
screening coefficient, albumin: 0.07

EXAMPLES 98–110

Similarly to Example 13, NMMO solutions with a 6% polymer content are prepared from cellulose acetate, cellulose propionate, cellulose butyrate, cellulose stearate, cellulose benzoate, cellulose phenyl acetate, cellulose phthalate, cellulose butyl carbamate, cellulose octadecyl carbamate, and cellulose tolyl carbamate, processed to form flat membranes, and tested for their biocompatibility properties. The results are summarized in Table 12.

TABLE 12

| Example | Membrane | $C_{5a}$-Reduction based on unmod. Cellulose membrane (%) |
|---|---|---|
|  | Linters Cellulose/Cellulose 2.5-acetate (50:50) | 50 |
| 98 | Cellulose 1.4-propionate | 83 |
| 99 | Cellulose 1.1-butyrate | 95 |
| 100 | Cellulose 0.08-stearate | 97 |
| 101 | Cellulose 0.04-stearate | 93 |
| 102 | Cellulose 0.55-benzoate | 86 |
| 103 | Cellulose 0.65-phenyl acetate | 91 |
| 104 | Cellulose 0.80-phthalate | 96 |
| 105 | Cellulose 1.70-phthalate | 98 |
| 106 | Cellulose 0.80-butyl carbamate | 95 |
| 107 | Cellulose 1.00-butyl carbamate | 97 |
| 108 | Cellulose 0.03-octadecyl carbamate | 65 |
| 109 | Cellulose 0.07-octadecyl carbamate | 82 |
| 110 | Cellulose 0.20-tolyl carbamate | 96 |

The thrombogenesis and heparin absorption are of the same order of magnitude as with cuprophan.

EXAMPLE 111

Figure 32:
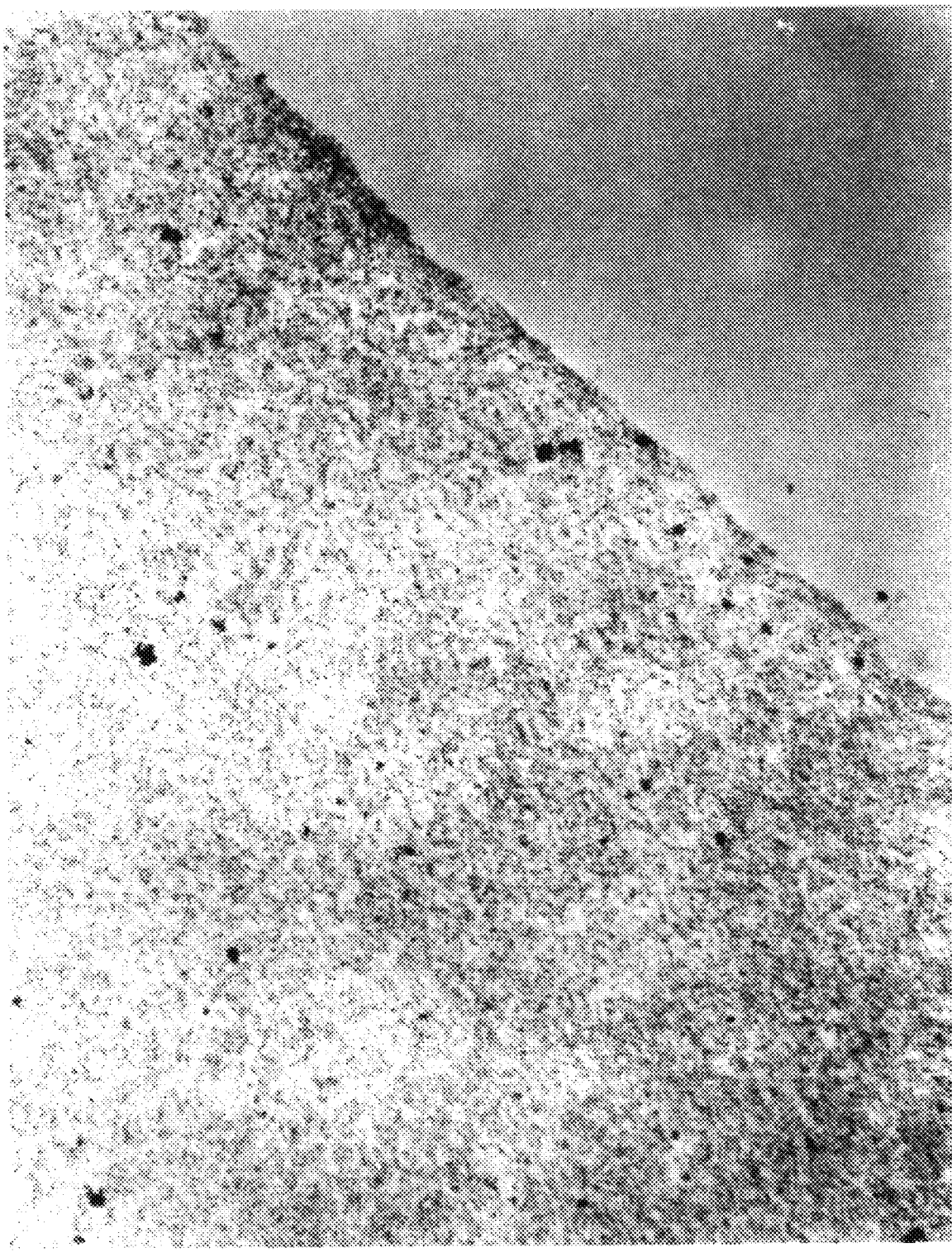
FIGS. 32 and 33 are microscopic photographs showing the porous structure of the membrane of Example 111.
Figure 33:

Similarly to the above example, with the addition of sodium carbonate (20% based on the polymer), an NMMO solution with a 6% benzylcellulose content of DS=0.24 is produced and processed to form flat membranes. A 1% 65° C. aqueous sulfuric acid solution is used as the regenerating bath. The membranes are washed with CS water and treated before drying with a mixture of glycerin, ethanol, and water (5:45:50 wt. %). The flat membrane produced in this fashion is 30 microns thick and had a very porous structure (see FIG. 32 externally, maximum pore size 10–20 nm; FIG. 33 internally, maximum pore size 20–30 nm).

What is claimed is:

1. A method for producing stable and storable cellulosic dialysis membranes for the low, middle, or high flux range with UFR values of 4 to 15, 15 to 50, or more than 50 ml/h m$^2$mm Hg, respectively, in the form of flat, tubular, or hollow fiber membranes, the method comprising producing a spinning solution composed of 3 to 40 parts of one or more of cellulose with a degree of polymerization (DP) greater than 300 or modified cellulose with a degree of polymerization (DP) greater than 200, 97 to 60 parts of a mixture of tertiary amine oxide and one or more additional liquids, optional one or more stabilizers, optional one or more pore formers, and optional spinning solution additives, extruding the spinning solution through a spinneret into a regenerating bath at a temperature of 10 to 95° C., with the takeoff speed being at least 30 m/min, single stage or multistage washing or extraction of the resultant membranes to remove the amine oxide and soluble additives to a content of less than 10 ppm, and drying to obtain the flat, tubular or hollow fiber membrane.

2. Method according to claim 1, wherein the tertiary amine oxide is N-methylmorpholine-N-oxide (NMMO) or dimethylcyclohexylamine-N-oxide.

3. Method according to claim 1, wherein the spinning solution is produced by a method of i) mixing the components of the spinning solution in a kneader and then feeding the mixture to a device in which the spinning solution is produced by removing water, degassing or both, ii) feeding the components of the spinning solution directly to a device for producing a spinning solution, or iii) mixing the components of the spinning solution in a kneader at 65 to 95° C., grinding the mixture after cooling, and feeding the ground mixture to a device to produce the spinning solution.

4. Method according to claim 1, wherein the production of the spinning solution takes place in one or more of an extruder, a film extruder or one or more flash evaporation stages, and the resultant spinning solution is fed by a spinning pump to the spinneret and spun.

5. Method according to claim 1, wherein the takeoff speed is at least 100 m/min.

6. Method according to claim 1, wherein an air gap of at least 1 mm in length is provided between the spinneret and the surface of the regenerating bath.

7. Method according to claim 1, wherein the extrusion is performed in a chamber between the spinneret and the regenerating bath, with steam or a mixture of steam with one or more of gaseous alcohol, ketone, dimethylacetamide, N-methylpyrrolidone, dioxane dimethyl-sulfoxide or dimethylformamide being located in said chamber.

8. Method according to claim 1, wherein the regenerating bath consists wholly or partially of water, monovalent or polyvalent alcohols, ketones, dimethylacetamide, N-methylpyrrolidone, dimethylsulfoxide, dimethylformamide, mixtures of these compounds, aqueous amine oxide or aqueous salt solution.

9. Method according to claim 1, wherein the spinneret dips into a regenerating bath having a temperature of at least 70° C.

10. Method according to claim 1, wherein the modified cellulose has an ether structure represented by the formula

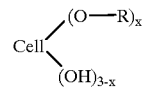

where Cell is the monomer unit of the unmodified cellulose, x corresponds to the degree of etherification which is in the range from 0.001 to 2.60, and R is a substituted or unsubstituted alkyl, alkenyl, cycloalkyl, cycloalkenyl, arylalkyl or arylalkenyl residue, wherein the carbon chain is optionally interrupted by oxygen or sulfur atoms.

11. Method according to claim 10, wherein the residue is substituted and contains one or more of a nonionic group of OH, OR', SH, SR', CN, halogen or R', a basic group of NH$_2$ or NHR', NR'$_2$, piperidine or morpholine, an ester group of COOR, SO$_3$R or Si(OR)$_3$, or, if the residue has more than three carbon atoms, an anionic group of COOH, SO$_3$H, OSO$_3$H, PO$_3$H, OPO$_3$H$_2$, Si(OH)$_3$ or salts thereof, where R'=H, methyl, ethyl, or R.

12. Method according to claim 10, wherein R is a benzyl, methylbenzyl, dimethylbenzyl, methoxybenzyl, chlorobenzyl, butyl, hydroxybutyl, hexyl, dodecyl, hydroxydodecyl, octadecyl, 3-butoxy-2-hydroxypropyl, 3-pentoxy-2-hydroxypropyl, 3-phenoxy-2-hydroxypropyl, dodecyl-2-hydroxypropylether, aminoethyl, dimethylaminoethyl, diethylaminoethyl, diiosopropylaminoethyl, piperidinoethyl, morpholinoethyl, dimethylaminopropyl, diethylaminopropyl, 3-dimethylamino-2-methylpropyl, triethylammonium ethyl, benzyl-diethylammonium ethyl, sulfobutyl, carboxybutyl, carboxyoctadecyl, cyanoethyl, allyl, isobutyl, mercaptododecyl, dodecylthio-2-hydroxypropyl ether, or phenylthio-2-hydroxypropyl group.

13. Method according to claim 1, wherein the modified cellulose has an ester structure shown by the formula

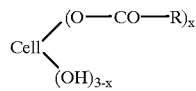

where Cell is the monomer unit of the unmodified cellulose, x corresponds to the degree of esterification which is in the range from 0.01 to 2.60, and R is a substituted or unsubstituted alkyl, alkenyl, cycloalkyl, cycloalkenyl, aryl, arylalkyl or arylalkenyl residue, and the carbon chain is optionally interrupted by oxygen or sulfur atoms.

14. Method according to claim 13, wherein the residue is substituted and contains one or more of a nonionic group of OH, OR', SH, SR', CN, halogen or R', a basic group of NH$_2$ or NHR', NR'$_2$, piperidine or morpholine, an ester group of COOR, SO$_3$R or Si(OR)$_3$, or, if the residue has more than three carbon atoms, an anionic group of COOH, SO$_3$H, OSO$_3$H, PO$_3$H, OPO$_3$H$_2$, Si(OH)$_3$ or salts thereof, where R'=H, methyl, ethyl, or R.

15. Method according to claim 13, wherein R—CO is the residue of propionic acid, butyric acid, capronic acid, caprylic acid, lauric acid, myristic acid, palmitic acid, stearic acid, arachidic acid, behenic acid, lauroleinic acid, myristoleinic acid, palmitoleinic acid, oleic acid, erucanic acid, linoleic acid, linolenic acid, eleostearic acid, arachidonic acid, erucic acid, acrylic acid, glutaric acid, adipic acid, pimelic acid, suberic acid, azelaic acid, sebacic acid, nonanedicarboxylic acid, undecanedicarbonic acid, dodecanedicarbonic acid, itaconic acid, aconitic acid, 5-norbornene-2,3-dicarbonic acid, dodecenylsuccinic acid, hexadecenylsuccinic acid, isovaleric acid, isocaproic acid, heptanoic acid, sorbinic acid, crotonic acid, 4-chlorobutanic acid, 2-chlorovalerianic acid, phenylacetic acid, benzoic acid, hydroxybenzoic acid, toluic acid, phthalic acid, sulfophthalic acid, or naphthalic acid.

16. Method for producing a dialysis membrane according to claim 1, wherein the modified cellulose has a carbamate structure shown by the formula

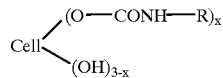

where Cell is the monomer unit of the unmodified cellulose, x corresponds to the degree of modification which is in the range from 0.01 to 2.60, and R is an alkyl, alkenyl, cycloalkyl, cycloalkenyl, aryl, arylalkyl, arylalkenyl or naphthyl residue, which is optionally substituted with one or more of a nonionic group of OH, OR', SH, SR', CN, halogen or R', a basic group of NH$_2$ or NHR', NR'$_2$, piperidine or morpholine, an ester group of COOR, SO$_3$H, OSO$_3$H, PO$_3$H, OPO$_3$H$_2$, Si(OH)$_3$ or salts thereof, where R'=H, methyl, ethyl, or R, and the carbon chain is optionally interrupted by oxygen or sulfur atoms.

17. Method according to claim 16, wherein R—NHCO is the residue of the substituent that results from the reaction of cellulose with butylisocyanate, 2-methylpropylisocyanate, octadecylisocyanate, phenylisocyanate, tolylisocyanate, naphthylisocyanate, cyclohexanisocyanate, chlorophenylisocyanate or chlorotolylisocyanate.

18. Method according to claim 1, wherein the spinning solution further contains one or more of
    i) 1 to 50 wt. % based on the weight of the unmodified or modified cellulose of a synthetic polymer comprising a homopolymer or copolymer of acrylic acid esters, methacrylic acid esters or maleic acid esters with acrylic acid, methacrylic acid, maleic acid, acrylamide, methacrylamide, vinylbenzene or vinyl alcohol, whereby up to 40 mol % free carboxyl groups can be present in the synthetic polymer,
    ii) 1 to 50 wt. % based on the unmodified or modified cellulose of a synthetic polymer comprising modified or unmodified polyacrylonitrile, or modified or unmodified polyamide, or
    iii) 1 to 50 wt. % based on the dissolved cellulosic and optional synthetic polymers of one or more organic, low molecular weight compounds comprising fatty alcohols, fatty acids, fatty acid esters or fatty amines.

19. Method according to claim 18, wherein the synthetic polymer or organic low molecular weight compound is dissolved in an organic solvent that is miscible with water, tertiary amine oxide or both and is mixed with the cellulose or modified cellulose already dissolved in the tertiary amine oxide, said solution optionally containing additional liquids, stabilizers, pore formers, and other spinning solution additives, before extrusion.

20. Method according to claim 1, wherein the spinning solution contains up to 40 wt. % spinning additive, based on the dissolved cellulosic and synthetic polymers, the spinning additive comprising one or more compounds of gallic acid ester, phosphonate salts, citric acid, ascorbic acid, mannose, glucose, sorbite, maltodextrin, microcrystalline cellulose, glycerin, ethylene glycol, polyethylene glycol, polyvinylpyrrolidone or inorganic salts.

21. Method according to claim 1, wherein the membrane is treated before drying with an aqueous solution of polyethylene glycol, polyvinylpyrrolidone, glycerin, ethylene glycol, propanediol, sorbite, glucose, or mixtures thereof.

22. Method according to claim 1, wherein the membrane is treated before drying with a solution of a cross-linking agent that is a compound that contains more than one glycidyl, isocyanate, anhydride, vinyl, or other groups that react with OH groups.

23. Method according to claim 1, wherein the membrane is in the form of a hollow fiber membrane, and wherein the spinneret is a hollow fiber spinneret and a cavity-forming fluid is introduced as an internal filling to form a lumen of the hollow fiber membrane, with the internal filling for forming the cavity being a liquid that boils above 70° C. and selected from the group consisting of fatty acid ester, paraffin oils, highly concentrated aqueous amine oxide solutions, glycerin, N-methylpyrrolidone, dimethylsulfoxide, dimethylformamide, polyethylene glycol, dimethylacetamide and aqueous solutions of these compound or being a gaseous substance selected from the group consisting of air, nitrogen and carbon dioxide.

24. Method according to claim 1, wherein the modification of the cellulose is performed directly in a solution of a tertiary amine oxide.

25. Method according to claim 1, wherein pores are caused to form in the membrane by the addition of a carbonate to the spinning solution and subjecting the material to an acid regenerating bath.

26. Method according to claim 1, wherein pore formation in the membrane is created by adding an ammonium salt to the spinning solution and subjecting the material to an alkaline regenerating bath.

27. Method according to claim 1, wherein the washing or extraction of the membrane is performed in a bath at a temperature of 20 to 95° C.

28. Method according to claim 1, wherein the one or more additional liquids are selected from the group comprising water, dimethylformamide, dimethylacetamide, dimethylsulfoxide and N-methylpyrrolidone.

29. Method according to claim 1, wherein before or after drying, the membranes are corrugated.

30. Method according to claim 1, wherein the method further comprises winding up the membranes.

* * * * *

UNITED STATES PATENT AND TRADEMARK OFFICE
CERTIFICATE OF CORRECTION

PATENT NO. : 6,019,925
DATED : February 1, 2000
INVENTOR(S) : Michael DIAMANTOGLOU; Martin NYWLT; and Winfried HÖLZ It is certified that error appears in the above-identified patent and that said Letters Patent is hereby corrected as shown below:

Column 12, line 16, "length A" should be "length Λ".

Signed and Sealed this

Third Day of April, 2001

Attest:

NICHOLAS P. GODICI

Attesting Officer     Acting Director of the United States Patent and Trademark Office